(12) United States Patent
Elshafie et al.

(10) Patent No.: US 11,943,028 B2
(45) Date of Patent: Mar. 26, 2024

(54) TECHNIQUES FOR COMMUNICATING CHANNEL STATE INFORMATION (CSI) FEEDBACK OVER A SIDELINK CHANNEL

(71) Applicant: QUALCOMM Incorporated, San Diego, CA (US)

(72) Inventors: Ahmed Elshafie, San Diego, CA (US); Seyedkianoush Hosseini, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/495,445

(22) Filed: Oct. 6, 2021

(65) Prior Publication Data

US 2023/0104280 A1 Apr. 6, 2023

(51) Int. Cl.
*H04B 7/06* (2006.01)
*H04L 5/00* (2006.01)
*H04W 72/0446* (2023.01)

(52) U.S. Cl.
CPC ......... *H04B 7/0626* (2013.01); *H04L 5/0048* (2013.01); *H04W 72/0446* (2013.01)

(58) Field of Classification Search
CPC ... H04L 5/0048; H04L 1/0026; H04L 1/1671; H04L 5/0023; H04L 5/0044; H04L 5/0051; H04L 5/0055; H04L 5/0057; H04B 7/0626; H04B 7/0413; H04W 72/0446; H04W 72/25
See application file for complete search history.

(56) References Cited

U.S. PATENT DOCUMENTS

| | | | |
|---|---|---|---|
| 11,665,672 B2 | 5/2023 | Elshafie et al. | |
| 2020/0228290 A1* | 7/2020 | Baghel | H04L 1/1893 |
| 2020/0313743 A1* | 10/2020 | Park | H04W 76/14 |
| 2022/0085923 A1* | 3/2022 | Ye | H04L 1/1825 |

* cited by examiner

*Primary Examiner* — Rina C Pancholi
(74) *Attorney, Agent, or Firm* — ArentFox Schiff LLP

(57) ABSTRACT

Some aspects described herein relate communicating channel state information (CSI) for sidelink transmissions over physical sidelink feedback channel (PSFCH) resources. The CSI can be communicated according to a CSI transmission timeline and/or an expiration timer that can account for periodic nature of the PSFCH resources.

30 Claims, 15 Drawing Sheets

TECHNIQUES FOR COMMUNICATING CHANNEL STATE INFORMATION (CSI) FEEDBACK OVER A SIDELINK CHANNEL

BACKGROUND

Aspects of the present disclosure relate generally to wireless communication systems, and more particularly, to communicating feedback for sidelink communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink and transmit communications to the base station over an uplink. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the transceiver and the memory. The one or more processors are configured to receive, from a transmitting user equipment (UE) in sidelink communications, a sidelink transmission, generate channel state information (CSI) for the sidelink transmission, and transmit, to the transmitting UE and based on a CSI transmission timeline, the CSI over a physical sidelink feedback channel (PSFCH).

In another aspect, an apparatus for wireless communication is provided that includes a transceiver, a memory configured to store instructions, and one or more processors communicatively coupled with the transceiver and the memory. The one or more processors are configured to transmit, to a receiving UE in sidelink communications, a sidelink transmission, and receive, from the receiving UE and based on a CSI transmission timeline, the CSI over a PSFCH.

In another aspect, a method for wireless communication by a receiving UE in sidelink communications is provided that includes receiving, from a transmitting UE in sidelink communications, a sidelink transmission, generating CSI for the sidelink transmission, and transmitting, to the transmitting UE and based on a CSI transmission timeline, the CSI over a PSFCH.

In another aspect, a method for wireless communication by a transmitting UE in sidelink communications is provided that includes transmitting, to a receiving UE in sidelink communications, a sidelink transmission, and receiving, from the receiving UE and based on a CSI transmission timeline, the CSI over a PSFCH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
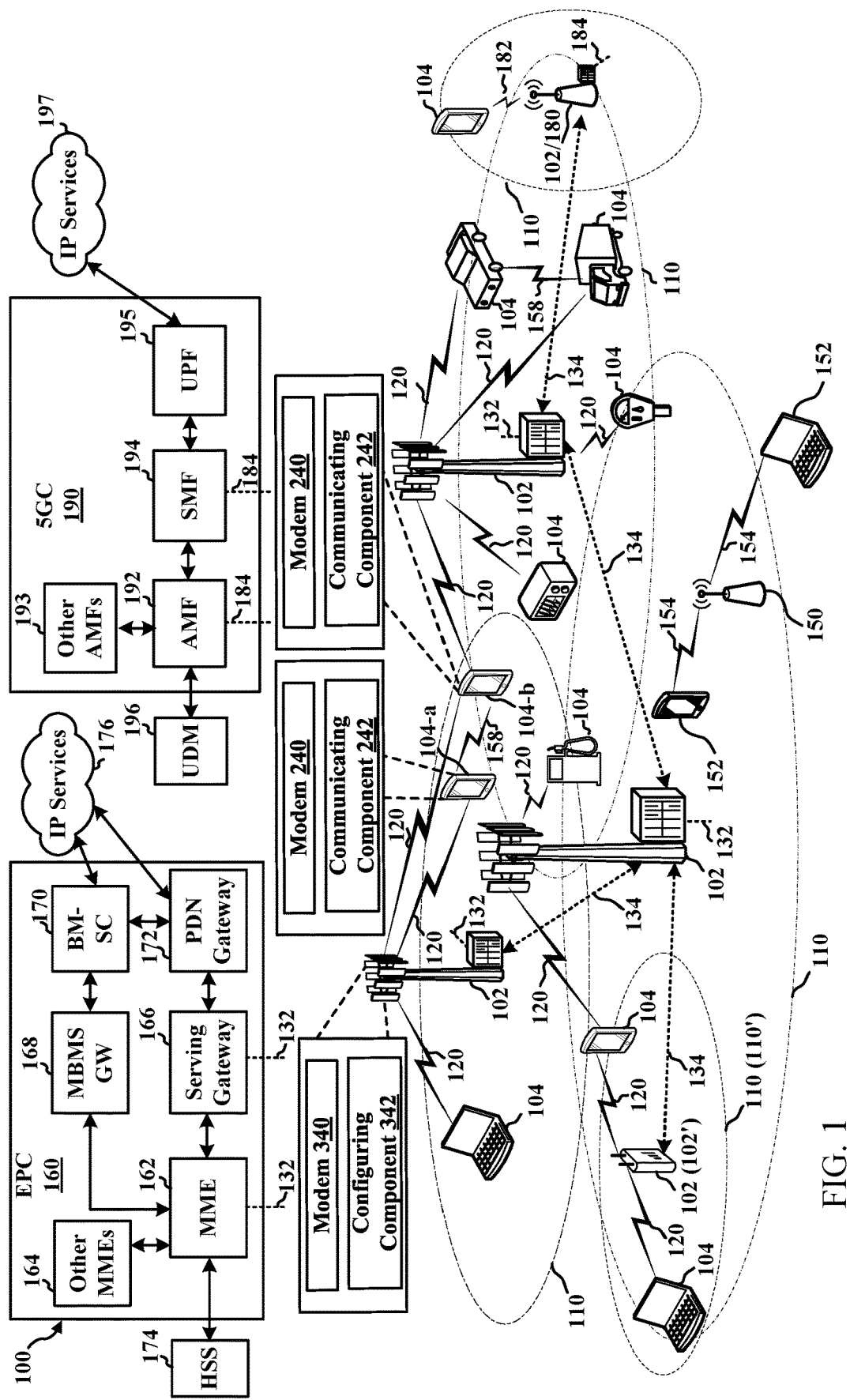
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to communicating channel state information (CSI) feedback for sidelink (SL) communications according to a CSI transmission timeline, which may be based on a number of slots, symbols, etc. For example, SL communications can refer to device-to-device (D2D) communication among devices (e.g., user equipment (UEs)) in a wireless network. In a specific example, SL communications can be defined for vehicle-based communications, such as vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a SL channel.

For example, a slot can include a collection of multiple symbols, where the multiple symbols can be one of orthogonal frequency division multiplexing (OFDM) symbols, single carrier-frequency division multiplexing (SC-FDM) symbols, or other types of symbols. In an example, the number of symbols in a slot may vary based on a cyclic prefix (CP) length defined for the symbols. A mini-slot, in an example, can include a portion of a slot, and thus a slot can include multiple mini-slots. In one example, UE can transmit SL communications in the slot or mini-slot, where a transmission time interval (TTI) can be the slot, the mini-slot, or each symbol within the slot or mini-slot. In addition, the UE can transmit SL communications over a channel defined by time resources and frequency resources, where the frequency resources can include a channel in multiple physical resource blocks (PRBs), a sub-channel of the channel, etc., and/or may be defined over a period of time (e.g., slot, symbol, etc.). The PRBs can include a collection of subcarriers or resource elements of a symbol.

Continued support and implementation of SL communications is provided in fifth generation (5G) new radio (NR) communication technologies. In 5G NR, there is a mapping between physical sidelink shared channel (PSSCH) and corresponding physical sidelink feedback channel (PSFCH) resources for transmitting feedback for the PSSCH. The mapping can be based on one or more of the starting sub-channel of PSSCH, which can be configured based on an information element sl-PSFCH-CandidateResourceType configured as startSubCH, the number of subchannels in a PSSCH, which can be configured based on an information element sl-PSFCH-CandidateResourceType configured as allocSubCH, the slot containing PSSCH (e.g., an index of the slot), the source identifier of the source node (e.g., UE) transmitting PSSCH, or the destination identifier of the destination node (e.g., UE) receiving the PSSCH. In addition, for example, the number of available PSFCH resources can be equal to or greater than the number of UEs in groupcast.

In 5G NR, for example, a base station or SL transmitting (Tx) UE can configure one or more sidelink receiving (Rx) UEs with parameters for determining PSFCH resources, including periodPSFCHresource, which can indicate PSFCH periodicity, in number of slots, in a resource pool, and may be set to 0, 1, 2, or 4, where 0 can indicate that PSFCH transmissions from a UE in the resource pool are disabled. In this example, the parameters may also include MinTimeGapPSFCH, which can indicate a minimum time gap, represented in number of slots, between a last slot of the PSSCH reception and a first slot that includes PSFCH resources of the resource pool, which can allow the SL Rx UE time to receive and process the PSSCH and generate feedback before transmission. In this example, the parameters may also include one or more of rbSetPSFCH indicating a set of $M_{PRB,set}^{PFSCH}$ PRBs in a resource pool for PSFCH transmission, numSubchannel indicating a number of $N_{subch}$ sub-channels for the resource pool, or $N_{PRB,set}^{PFSCH}$ indicating a number of PSSCH slots associated with a PSFCH slot, which can be determined by periodPSFCHresource. In this example, $M_{PRB,set}^{PFSCH} = \alpha \cdot N_{subch} \cdot N_{PSSCH}^{PFSCH}$, and $$M_{subch,slot}^{PFSCH} = \frac{M_{PRB,set}^{PFSCH}}{N_{subch} \cdot N_{PSSCH}^{PFSCH}}.$$

Currently, in 5G NR (e.g., in V2X), there is a minimum time gap MinTimeGapPSFCH for the UE to send hybrid automatic repeat/request (HARQ)-acknowledgement (ACK) of a PSSCH signal, where the UE uses the next available PSFCH resource after MinTimeGapPSFCH slots to send the feedback, where currently the minimum value is 2 slots. HARQ-ACK, as generally referred to herein, can include transmission of ACK or negative-ACK (NACK) as HARQ feedback over associated resources. Similarly, for CSI that is going to be sent on a periodic carrier such as PSFCH or certain period resources (e.g., allocated PSSCH) to feedback CSI, a minimum CSI computation timeline can be configured so that the SL Rx UEs can determine whether their corresponding CSI is included in the CSI carrier or not. CSI from PSSCH can help in 1) avoiding automatic gain control (AGC) distortion at the SL Rx UE in multiple-user (MU)-multiple-input multiple-output (MIMO) scenarios by controlling the two SL Tx UEs power levels. For example, a SL Rx UE computes power levels (such as demodulation reference signal (DMRS) reference signal received power (RSRP) to balance the received signals from both MU-MIMO links, and feeds back this CSI to SL Tx UEs. CSI from PSSCH can also help in 2) performing link adaptation to change modulation and coding scheme (MCS), especially in retransmission (e.g., the SL Tx UE can reserve 2 future resources for retransmission of a current transport block (TB) for transmitting based on feedback from the SL Rx UE).

In an example, a SL Rx UE can use aperiodic CSI (A-CSI) reporting in PSFCH where the SL Rx UE can report CSI faster than media access control-control element (MAC-CE) in layer 2 (L2) and the processing can be faster since PSFCH is layer 1 (L1). As PSFCH has certain periodicity and is configurable per a resource pool, there are some timeline considerations that can be taken into account for CSI (regardless of the CSI source being CSI-RS or PSSCH). For example, a minimum computation time for CSI can be considered at least partly based on UE capability. Aspects described herein relate to timeline considerations for CSI (generated by either PSSCH or CSI-RS) carried by the PSFCH, and/or considerations for reserved resources CSI and maintained quasi-colocation (QCL) and phase coherency.

In aspects described herein, a SL Rx UE can receive PSSCH (or other sidelink communications, such as physical sidelink control channel (PSCCH), CSI-RS, etc.) from a SL Tx UE, and can transmit CSI feedback based on the PSSCH (or other sidelink communications), the corresponding DMRS or log likelihood ratios (LLRs), etc. based on a CSI transmission timeline. In some aspects, the CSI transmission timeline can include, or be defined according to, a minimum time gap for transmitting CSI in PSFCH resources after receiving the PSSCH (or other sidelink communications) for which feedback is being provided. In addition, the CSI transmission timeline may include, or be defined according to, an aging parameter that can expire the CSI transmission if PSFCH resources occur too long of a time after receiving the PSSCH (or other sidelink communications) for which feedback is being provided. In some aspects, collision between CSI feedback from one SL Rx UE and hybrid automatic repeat/request (HARD) feedback from another SL Rx UE can be handled by providing separate CSI feedback resources in the resource pool. In some aspects, a base station can configure the resource pool, and can notify the SL Rx UEs (e.g., via SL Tx UEs or otherwise) of the PSFCH resources (e.g., generally and/or specifically for CSI feedback).

The aspects described herein can allow for SL Rx UEs to receive aperiodic CSI-RSs from SL Tx UEs and report feedback within a time that is useful for the SL Tx UE to modify communication parameters to improve communications between the SL Tx UE and the SL Rx UE. Enabling useful and efficient reporting of CSI feedback, in this regard, can improve communication quality and/or throughput for SL devices, which can improve user experience, etc.

The described features will be presented in more detail below with reference to FIGS. 1-15.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for transmitting or receiving CSI over a physical feedback channel, such as PSFCH, according to a CSI transmission timeline, as described further herein. In addition, some nodes may have a modem 340 and configuring component 342 for configuring UEs with resources or resource pools, CSI transmission timelines, etc. for transmitting or receiving CSI over the physical feedback channel, as described herein. Though UEs 104-*a* and 104-*b* is shown as having the modem 240 and communicating component 242 and a base station 102 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-*a* and 104-*b*) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. In addition, in this regard, UEs 104-a, 104-b can use a portion of frequency in the 5 GHz unlicensed frequency spectrum in communicating with the small cell 102', with other cells, with one another using sidelink communications, etc. The UEs 104-a, 104-b, small cell 102', other cells, etc. can use other unlicensed frequency spectrums as well, such as a portion of frequency in the 60 GHz unlicensed frequency spectrum.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE 104-a can be a SL transmitting UE that can transmit SL communications to a receiving UE 104-b. In this example, the SL transmitting UE 104-a can transmit, to the SL receiving UE 104-b, sidelink communications, and the SL receiving UE 104-b can transmit CSI to the SL transmitting UE 104-a, where the CSI can be derived from sidelink communications received from the SL transmitting UE 104-a. In an example, SL receiving UE 104-b can transmit the CSI over a physical feedback channel, such as PSFCH. As feedback resources may be periodically scheduled and/or configurable per resource pool, SL receiving UE 104-b can transmit the CSI according to a CSI transmission timeline to allow the SL receiving UE 104-*b* enough time to process the sidelink communications and generating the CSI. In addition, SL receiving UE 104-*b* can transmit the CSI in consideration of an expiration timer for the CSI to ensure the CSI is used by the SL transmitting UE 104-*a*. In addition, in an example, base station 102 can configure the SL transmitting UE 104-*a* and/or SL receiving UE 104-*b* with resource pools, CSI transmission timelines, and/or other parameters for communicating the SL communications and/or the corresponding CSI.

Figure 4:
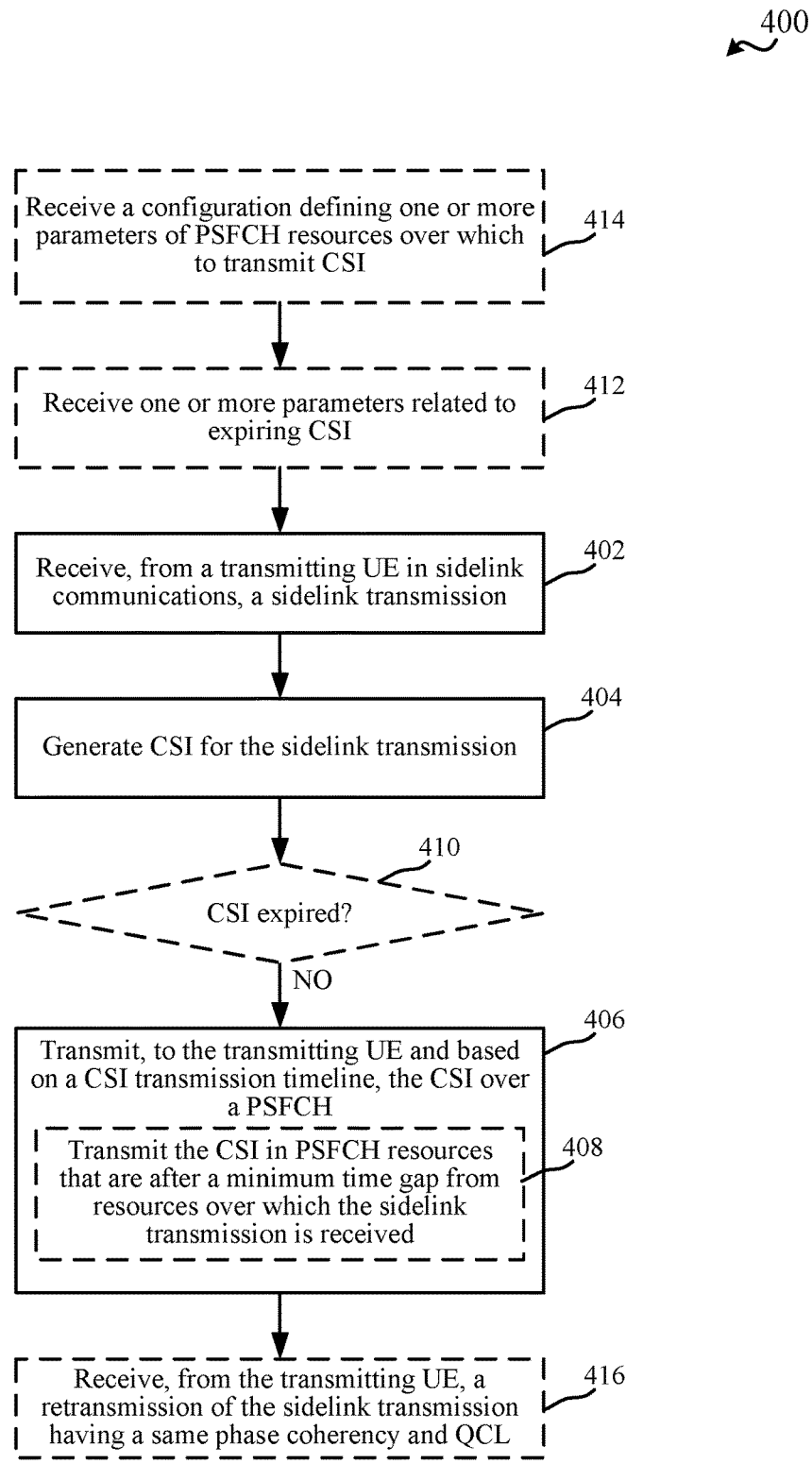
FIG. 4 is a flow chart illustrating an example of a method for transmitting, by a sidelink (SL) receiving user equipment (UE), channel state information (CSI) to a SL transmitting UE that transmits SL communications to the SL receiving UE, in accordance with various aspects of the present disclosure.
Figure 5:
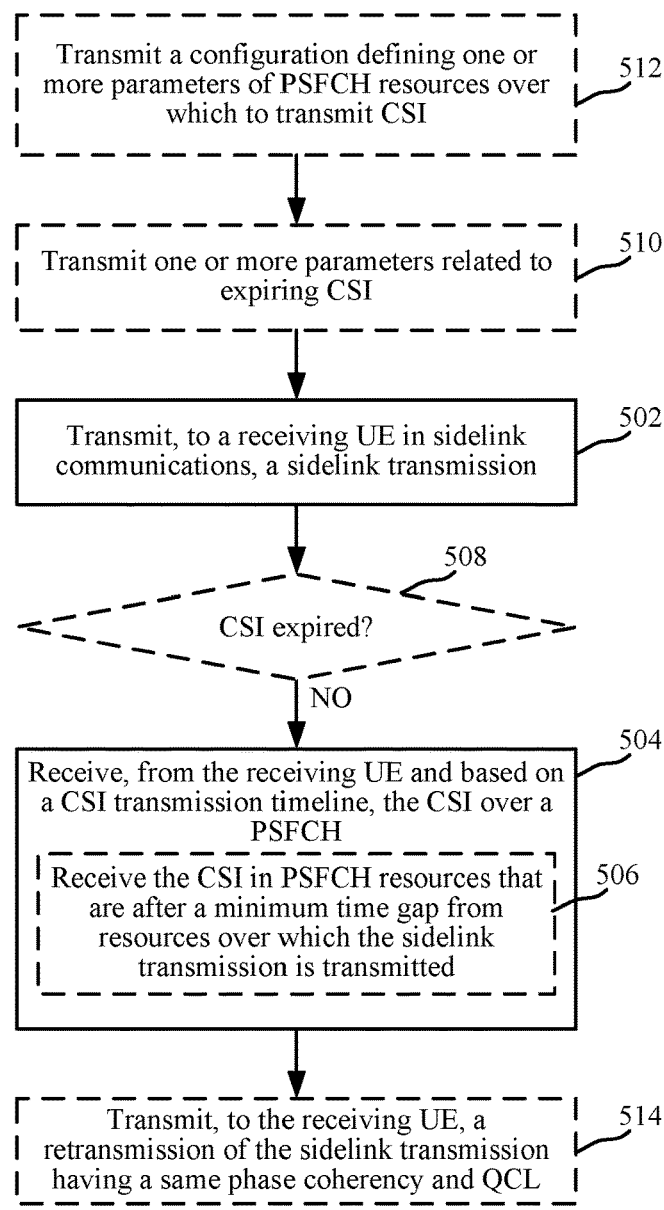
FIG. 5 is a flow chart illustrating an example of a method for receiving, by a SL transmitting UE, CSI from a SL receiving UE that receives SL communications from the SL transmitting UE, in accordance with various aspects of the present disclosure.
Figure 6:
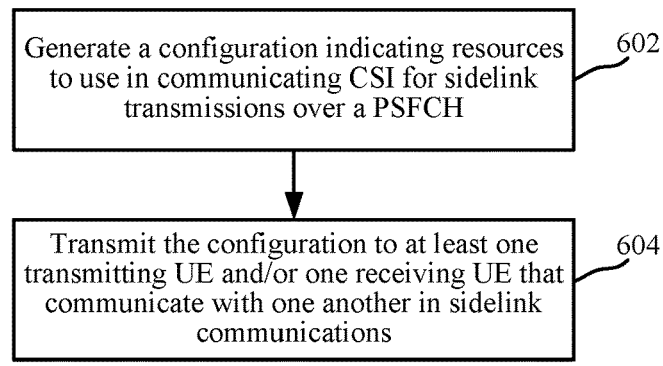
FIG. 6 is a flow chart illustrating an example of a method for configuring SL UEs to communicate CSI using physical sidelink feedback channel (PSFCH) resources, in accordance with various aspects of the present disclosure.

Turning now to FIGS. 2-15, aspects are depicted with reference to one or more components and one or more methods that may perform the actions or operations described herein, where aspects in dashed line may be optional. Although the operations described below in FIGS. 4-6 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
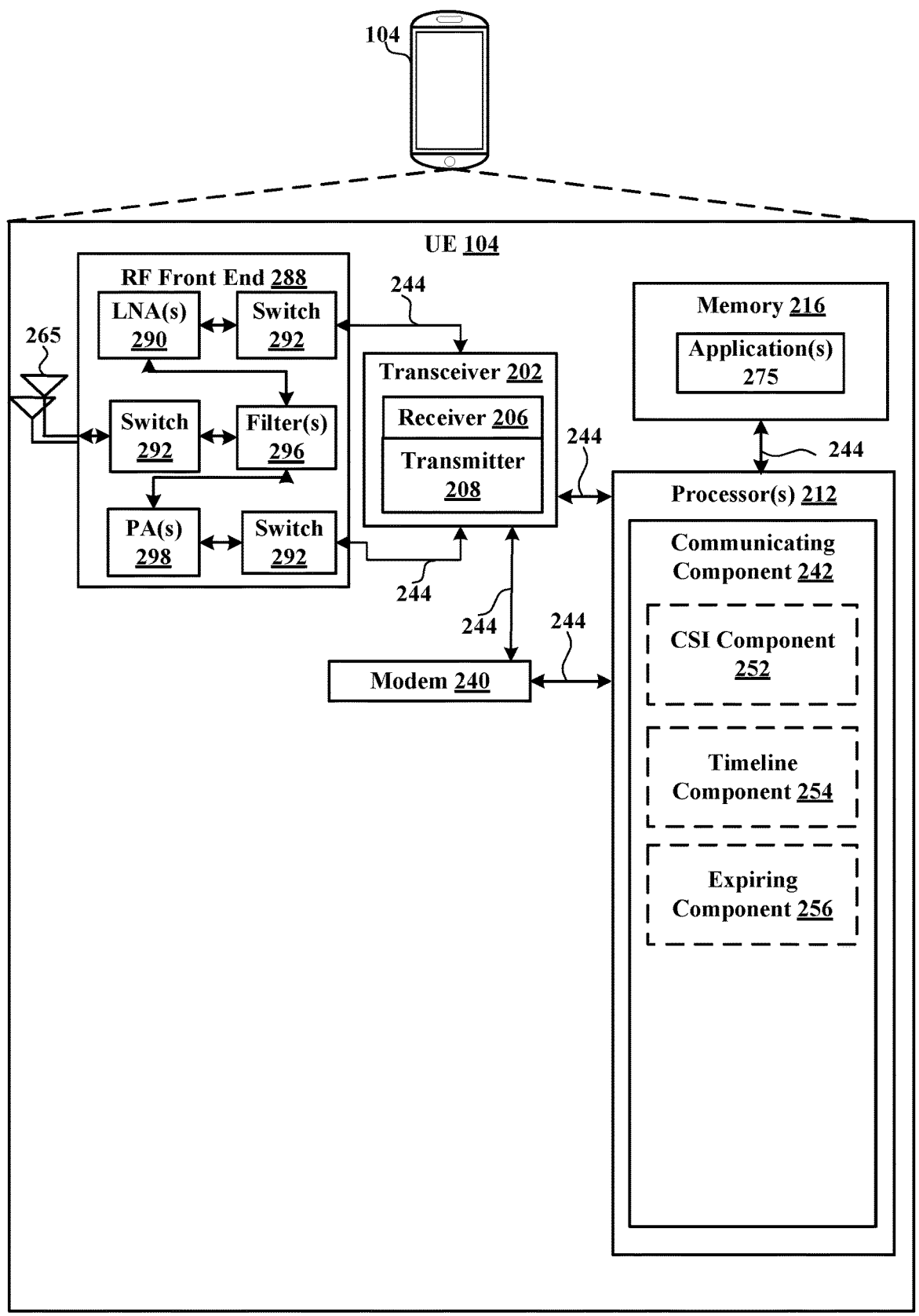
FIG. 2 is a block diagram illustrating an example of a user equipment (UE), in accordance with various aspects of the present disclosure.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for transmitting or receiving CSI over a physical feedback channel, such as PSFCH, according to a CSI transmission timeline, as described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102 or a SL transmitting UE. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, receiving wireless communications transmitted by at least one base station 102 or a SL transmitting UE, transmitting wireless communications to at least one base station 102 or a SL receiving UE, etc. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include one or more of a CSI component 252 for generating CSI for transmitting to a UE in SL communications or processing CSI received from a UE in SL communications, a timeline component 254 for determining a CSI transmission timeline by which to transmit or receive the CSI, and/or an expiring component 256 for determining whether CSI is expired prior to transmitting or receiving the CSI, as described herein.

In an aspect, the processor(s) 212 may correspond to one or more of the processors described in connection with the UE in FIG. 15. Similarly, the memory 216 may correspond to the memory described in connection with the UE in FIG. 15.

Figure 3:
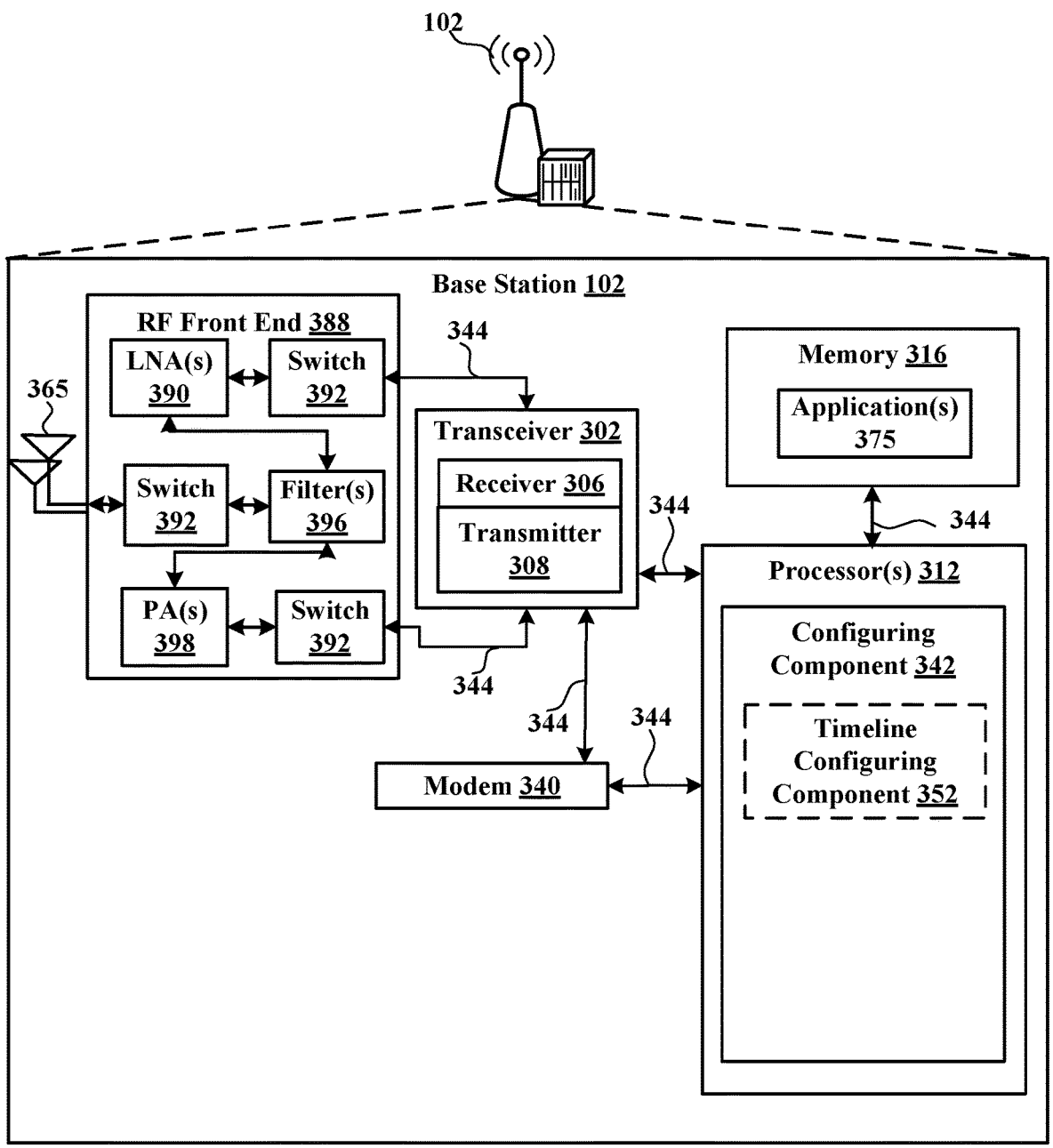
FIG. 3 is a block diagram illustrating an example of a base station, in accordance with various aspects of the present disclosure.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring UEs with resources or resource pools, CSI transmission timelines, etc. for transmitting or receiving CSI over the physical feedback channel, as described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a timeline configuring component 352 for configuring one or more UEs with a CSI transmission timeline or other parameters related to transmitting CSI over a physical sidelink channel, as described herein.

In an aspect, the processor(s) 312 may correspond to one or more of the processors described in connection with the base station in FIG. 15. Similarly, the memory 316 may correspond to the memory described in connection with the base station in FIG. 15.

FIG. 4 illustrates a flow chart of an example of a method 400 for transmitting, by a SL receiving UE, CSI to a SL transmitting UE that transmits SL communications to the SL receiving UE. In an example, a UE (e.g., UE 104-*b*, as a SL receiving UE in sidelink communications) can perform the functions described in method 400 using one or more of the components described in FIGS. 1 and 2.

In method 400, at Block 402, a SL receiving UE 104-*b* can receive, from a transmitting UE in SL communications, a SL transmission. In an aspect, communicating component 242, e.g., in conjunction with processor(s) 212, memory 216, transceiver 202, etc., can receive, from the transmitting UE (e.g., SL transmitting UE 104-*a*) in SL communications, the SL transmission. For example, a base station 102 can configure resources or a resource pool for SL communications. In this example, the SL transmitting UE 104-*a* can transmit SL communications over the resources, or SL resources selected from the resource pool, and SL receiving UE 104-*b* can receive the SL communications over the resources. The SL communications can include data transmitted over a PSSCH, control data for the PSSCH data transmitted over a PSCCH, a DMRS or LLRs for the data transmitted over the PSSCH (or DMRS or LLRs for the control data transmitted over PSCCH), a CSI-RS or other reference signal, etc.

In method 400, at Block 404, the SL receiving UE 104-*b* can generate CSI for the SL transmission. In an aspect, CSI component 252, e.g., in conjunction with processor(s) 212, memory 216, transceiver 202, communicating component 242, etc., can generate the CSI for the SL transmission. For example, CSI component 252 can generate the CSI based on the received SL transmission to indicate a channel state determined from signal properties of the SL transmission. In an example, CSI component 252 can generate the CSI for the SL transmitting UE 104-*a* to use in adjusting parameters for transmitting SL communications to the SL receiving UE 104-*b*, granting SL resources to the SL receiving UE 104-*b*, and/or the like.

In method 400, at Block 406, the SL receiving UE 104-*b* can transmit, to the transmitting UE and based on a CSI transmission timeline, the CSI over a PSFCH. In an aspect, CSI component 252, e.g., in conjunction with processor(s) 212, memory 216, transceiver 202, communicating component 242, timeline component 254, etc., can transmit, to the transmitting UE (e.g., SL transmitting UE 104-*a*) and based on the CSI transmission time, which can be determined by timeline component 254, the CSI over a PSFCH. For example, as transmission of SL communications and reporting of corresponding CSI may be periodic, CSI component 252 can transmit the CSI based on a CSI transmission timeline that allows sufficient time to process received SL communications and generate CSI and/or can allow for determining a next opportunity for transmitting the CSI over the feedback channel (e.g., PSFCH).

In one example, in transmitting the CSI at Block 406, optionally at Block 408, the SL receiving UE 104-*b* can transmit the CSI in PSFCH resources that are after a minimum time gap from resources over which the SL transmission is received. In an aspect, CSI component 252, e.g., in conjunction with processor(s) 212, memory 216, transceiver 202, communicating component 242, timeline component 254, etc., can transmit the CSI in the PSFCH resources that are after a minimum time gap from resources over which the SL transmission is received. For example, CSI component 252 can determine the PSFCH resources based on information received from the SL transmitting UE 104-*a*, base station 102, etc., which may indicate resources for transmitting PSFCH. For example, CSI component 252 can determine the PSFCH resources as occurring from at least an offset from receiving the SL communications (e.g., a slot offset of a number of slots from a slot during which the SL communications are received).

In addition, in an example, timeline component 254 can determine the CSI transmission timeline for transmitting the CSI, which may be based on the minimum time gap, based on other considerations, such as determining resources after the minimum time gap that are indicated as, or otherwise reserved for, transmitting CSI (whether over PSFCH or other resources), etc. In an example, the minimum time gap may be similar to (e.g., equal to), less than, or greater than a feedback minimum time gap for transmitting HARQ feedback for the SL communications, as described further herein.

In an example, a timeline for CSI from a physical channel can be defined so that the UEs (e.g., the SL receiving UE 104-b and/or SL transmitting UE 104-a) can determine if a CSI is transmitted in a next available CSI carrier (e.g., which may include the next available PSFCH resources) or not. For example, the physical channel may include PSSCH and/or corresponding DMRS or LLRs, CSI-RS, etc. In an example, if the CSI carrier is PSFCH (e.g., if timeline component 254 determines that the CSI carrier is PSFCH, such as next PSFCH resources), a MinTimeGap_CSI_in_PSFCH can be set or determined as a function of the SL receiving UE 104-b capability to compute the CSI from PSSCH or from CSI-RS (which may be of different minimum time in general). For example, for PSSCH-based CSI, timeline component 254 can set or determine the minimum time gap as MinTimeGap_CSI_in_PSFCH_PSSCH_based. For example, if CSI is from a DMRS or LLRs associated with the PSSCH (or associated with a corresponding PSCCH), the minimum time gap MinTimeGap_CSI_in_PSFCH_PSSCH_based may be lower than the feedback timing gap (e.g., HARQ-ACK MinTimeGapPSFCH). For example, DMRS or LLRs may be from sidelink control information (SCI)-1 (PSCCH) or from PSSCH or both. In another example, if CSI is from PSSCH data tones (and/or decoder statistics, which may include a number of iterations, input/output LLRs, number of unsatisfied parity checks, etc.), MinTimeGap_CSI_in_PSFCH_PSSCH_based may be higher than the feedback timing gap (e.g., HARQ-ACK MinTimeGapPSFCH).

In another example, for CSI-RS-based CSI (where CSI is from CSI-RS), the minimum time gap for reporting CSI via PSFCH, MinTimeGap_CSI_in_PSFCH_CSI-RS_based, can be larger than MinTimeGap_CSI_in_PSFCH_PSSCH_based for PSSCH-based CSI. As CSI is transmitted in PSFCH, and PSFCH has certain periodicity, timeline component 254 can determine the timeline for transmitting PSFCH, as opposed to conventional CSI transmitted in MAC-CE, where there may not be a minimum time gap for CSI computation based on CSI-RS.

In method 400, optionally at Block 410, the SL receiving UE 104-b can determine whether CSI is expired, and/or can transmit the CSI based on determining that CSI is not expired. In an aspect, expiring component 256, e.g., in conjunction with processor(s) 212, memory 216, transceiver 202, communicating component 242, etc., can determine whether the CSI is expired and/or can transmit the CSI based on determining that the CSI is not expired. For example, as the resources over which to transmit CSI may be periodic, the CSI may become stale and may be expired so that the SL transmitting UE 104-a does not process or consider old CSI.

In an example, CSI aging can be taken into account by considering an expiry/bound time. For example, SL receiving UE 104-b can use a CSI expiration timer parameter, CSI_PSSCH_expiry_timer, to determine whether the CSI is expired. For example, expiring component 256 can initialize a CSI expiration timer based on the parameter value, and if the CSI expiration timer expires, CSI component 252 can determine to not transmit the CSI. In an example, CSI_PSSCH_expiry_timer may be the same as, or may have the same value as. the CSI-RS-based CSI parameter sl-LatencyBound-CSI-Report, and thus may be this parameter or a newly defined parameter. In an example, SL receiving UE 104-b can use sl-LatencyBound-CSI-Report to determine whether to discard the CSI generated from PSSCH (e.g., at Block 404). In another example, CSI component 252 can cancel or expire the CSI transmission by configuration where the base station 102 (e.g., using downlink control information (DCI) or radio resource control (RRC)/MAC-CE signaling) or the SL transmitting UE 104-a (e.g., using SCI) can indicate to the SL receiving UE 104-b when a CSI is to be cancelled. For example, this information can be in terms of time slots (e.g., as indicated by a parameter, such as CSI_PSSCH_expiry_timer), which may be set using PC-5-RRC, PC5-MAC-CE, DCI (e.g., from base station 102) or SCI (e.g., from the SL transmitting UE 104-a), etc. In yet another example, expiration of CSI can be associated with PSFCH periodicity per resource pool. In this example, CSI may be determined as expired, or otherwise to be cancelled, if the periodicity of PSFCH is higher than X slots, where X can be configured by the base station 102, SL transmitting UE 104-a, etc. using PC5-RRC, PC5-MAC-CE, DCI, SCI, etc. In yet another example, expiration time may be dynamic in a way that CSI is determined to be expired or otherwise is cancelled immediately if it cannot be sent on the same PSFCH resource that carries the HARQ-ACK (e.g., based on the minimum time gap).

In method 400, optionally at Block 412, the SL receiving UE 104-b can receive one or more parameters related to expiring CSI. In an aspect, expiring component 256, e.g., in conjunction with processor(s) 212, memory 216, transceiver 202, communicating component 242, etc., can receive the one or more parameters (e.g., from SL transmitting UE 104-a, base station 102, etc.) related to expiring CSI. For example, the one or more parameters can include a value for initializing the CSI expiration timer for aperiodic CSI reporting, such as sl-LatencyBound-CSI-Report, which may be defined for legacy UEs that may not support transmitting CSI over PSFCH resources, or a more general parameter, such as a CSI_PSSCH_expiry_timer, etc. In another example, the one or more parameters may include the PSFCH periodicity per resource pool or parameters for determining when to expire CSI based on the PSFCH periodicity. In another example, the one or more parameters may include an indication to expire CSI if it cannot be sent on the same PSFCH resource that carries the HARQ-ACK. In an example, expiring component 256 can receive the one or more parameters in RRC signaling, MAC-CE, DCI, SCI, etc., as described above and further herein.

FIGS. 7-10 illustrate various examples of transmitting CSI based on a minimum time gap and/or an expiration timer.

Figure 7:
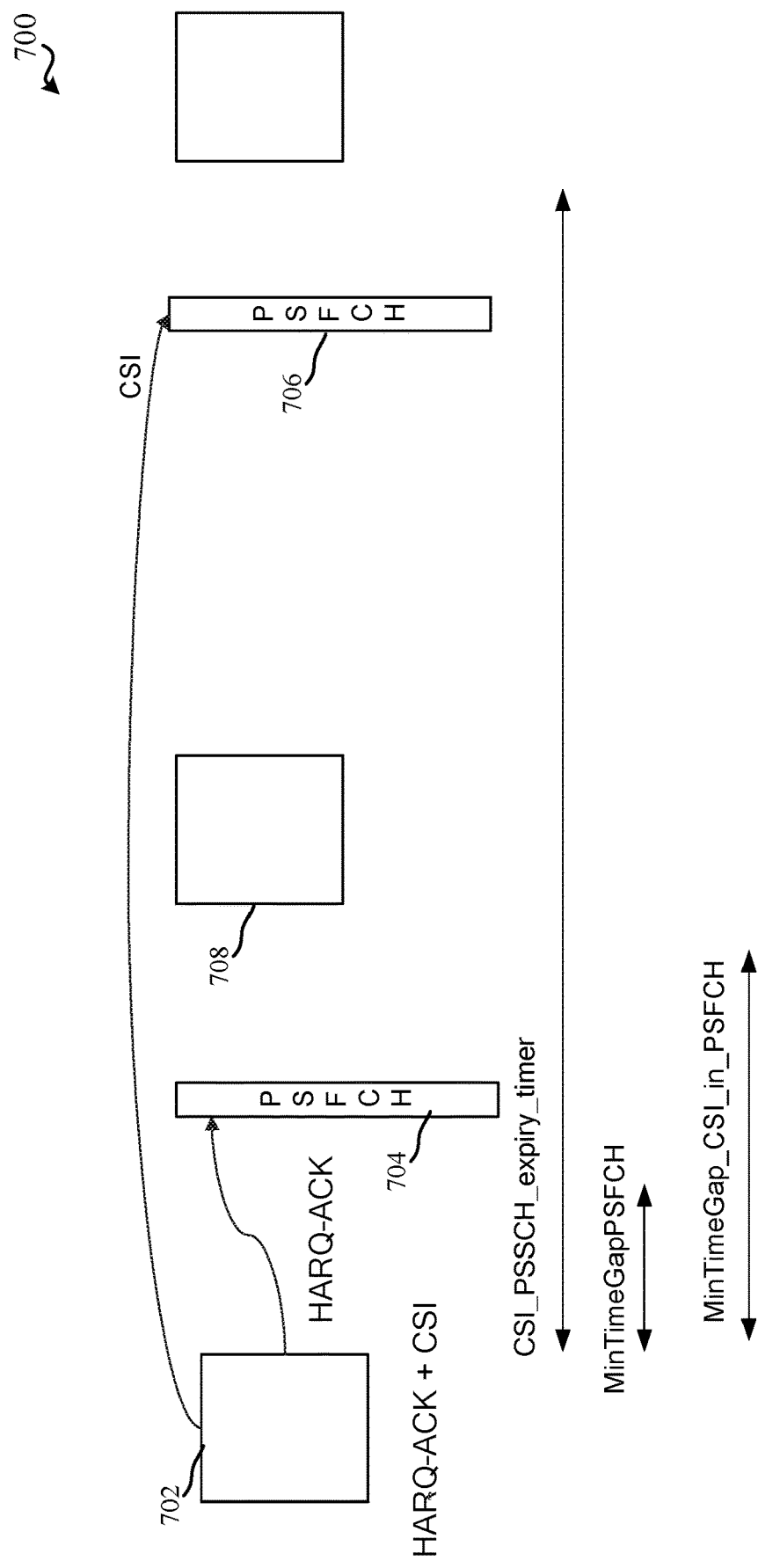
FIG. 7 is an example of a CSI transmission timeline where CSI can be transmitted in PSFCH resources, in accordance with various aspects of the present disclosure.

FIG. 7 illustrates an example of a CSI transmission timeline 700 where CSI can be transmitted in PSFCH resources. According to CSI transmission timeline 700, a SL receiving UE 104-b can receive a SL communication 702 for which HARQ-ACK and CSI can be generated. Based on PSFCH resources 704 occurring after the feedback minimum time gap, MinTimeGapPSFCH, SL receiving UE 104-b can transmit the HARQ-ACK for the SL communication 702 in PSFCH resources 704. For CSI, however, as the PSFCH resources do not occur after the minimum time gap for transmitting CSI, MinTimeGap_CSI_in_PSFCH, SL receiving UE 104-b can refrain from transmitting CSI in PSFCH resources 704 and can instead wait for PSFCH resources 706 occurring after MinTimeGap_CSI_in_PSFCH. This can be despite another SL communication having been received at 708. In addition, SL receiving UE 104-*b* can determine to transmit CSI in PSFCH resources 706 based on the expiration timer, CSI_PSSCH_expiry_timer, having not expired before PSFCH resources 706.

Figure 8:
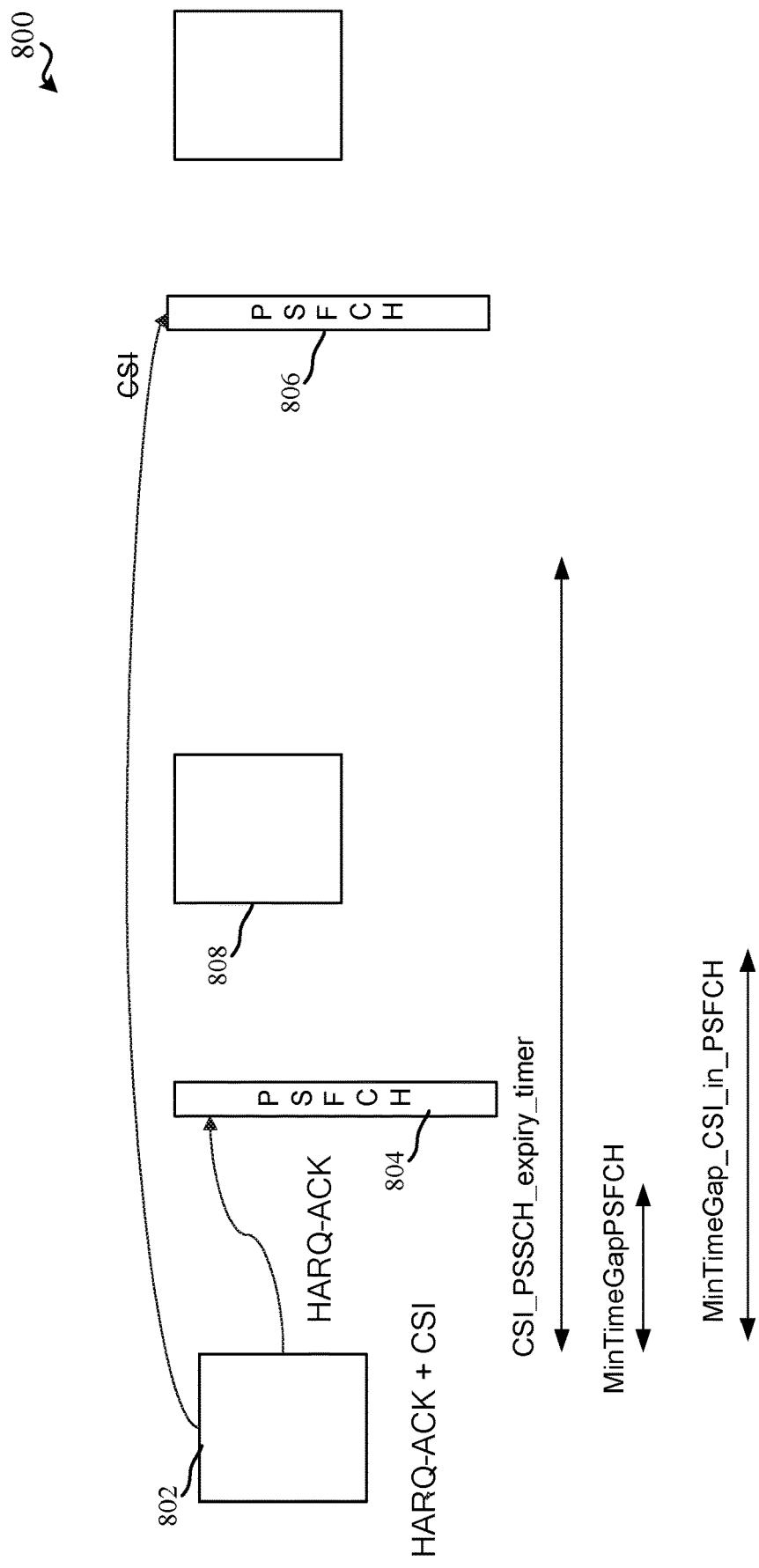
FIG. 8 is an example of a CSI transmission timeline where CSI is not transmitted in PSFCH resources, in accordance with various aspects of the present disclosure.

FIG. 8 illustrates an example of a CSI transmission timeline 800 where CSI is not transmitted in PSFCH resources. According to CSI transmission timeline 800, a SL receiving UE 104-*b* can receive a SL communication 802 for which HARQ-ACK and CSI can be generated. Based on PSFCH resources 804 occurring after the feedback minimum time gap, MinTimeGapPSFCH, SL receiving UE 104-*b* can transmit the HARQ-ACK for the SL communication 802 in PSFCH resources 804. For CSI, however, as the PSFCH resources do not occur after the minimum time gap for transmitting CSI, MinTimeGap_CSI_in_PSFCH, SL receiving UE 104-*b* can refrain from transmitting CSI in PSFCH resources 804 and can instead wait for PSFCH resources 806 occurring after MinTimeGap_CSI_in_PSFCH. This can be despite another SL communication having been received at 808. SL receiving UE 104-*b* can determine, however, to refrain from transmitting CSI in PSFCH resources 806 based on the expiration timer, CSI_PSSCH_expiry_timer, expiring before PSFCH resources 806. In this example, SL receiving UE 104-*b* can cancel or delete, etc., the CSI.

Figure 9:
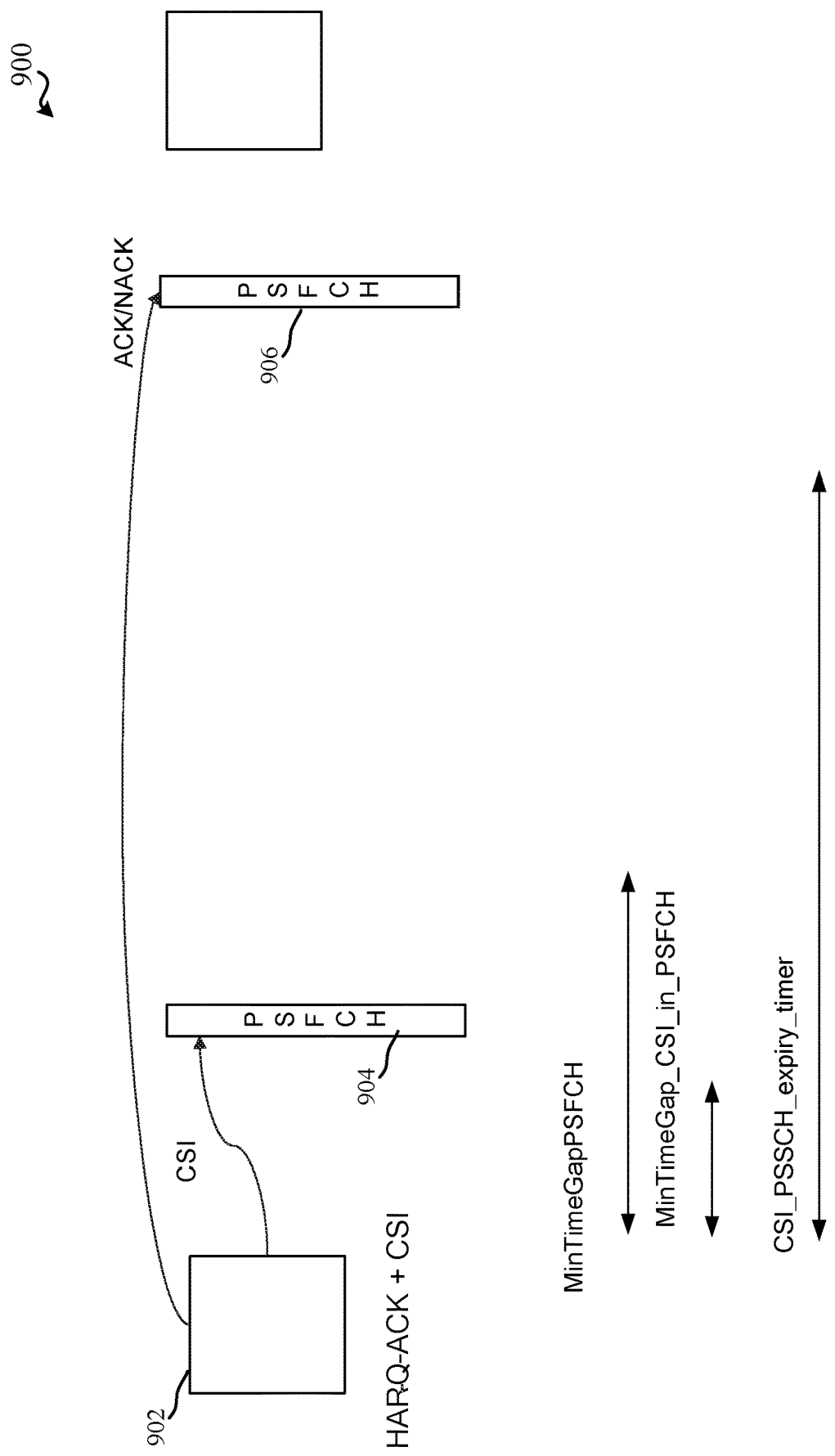
FIG. 9 is an example of a CSI transmission timeline where CSI can be transmitted in PSFCH resources earlier than hybrid automatic repeat/request (HARQ)-acknowledgement (ACK) feedback, in accordance with various aspects of the present disclosure.

FIG. 9 illustrates an example of a CSI transmission timeline 900 where CSI can be transmitted in PSFCH resources earlier than HARQ-ACK feedback. According to CSI transmission timeline 900, a SL receiving UE 104-*b* can receive a SL communication 902 for which HARQ-ACK and CSI can be generated. Based on PSFCH resources 904 occurring after the minimum time gap, MinTimeGap_CSI_in_PSFCH, SL receiving UE 104-*b* can transmit the CSI for the SL communication 902 in PSFCH resources 904. For HARQ-ACK, however, as the PSFCH resources do not occur after the feedback minimum time gap, MinTimeGapPSFCH SL receiving UE 104-*b* can refrain from transmitting HARQ-ACK in PSFCH resources 904 and can instead wait for PSFCH resources 906 occurring after MinTimeGapPSFCH.

Figure 10:
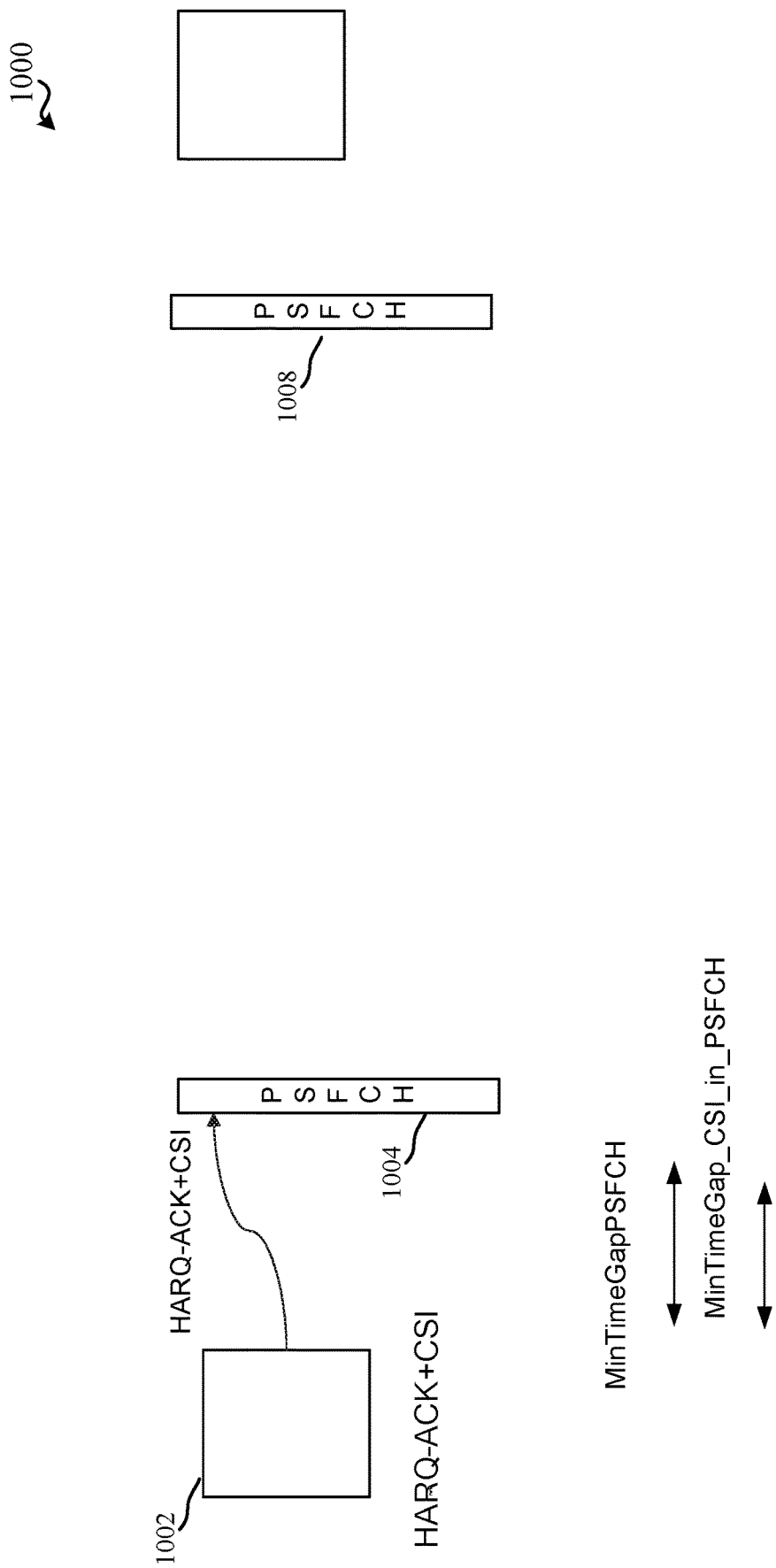
FIG. 10 is an example of a CSI transmission timeline where CSI can be transmitted in PSFCH resources along with HARQ-ACK feedback, in accordance with various aspects of the present disclosure.

FIG. 10 illustrates an example of a CSI transmission timeline 1000 where CSI can be transmitted in PSFCH resources along with HARQ-ACK feedback. According to CSI transmission timeline 1000, a SL receiving UE 104-*b* can receive a SL communication 1002 for which HARQ-ACK and CSI can be generated. Based on PSFCH resources 1004 occurring after the minimum time gap, MinTimeGap_CSI_in_PSFCH, and feedback minimum time gap, MinTimeGapPSFCH, SL receiving UE 104-*b* can transmit the CSI and HARQ-ACK for the SL communication 1002 in PSFCH resources 1004, without necessarily transmitting in PDFCH resources 1008.

Figure 11:
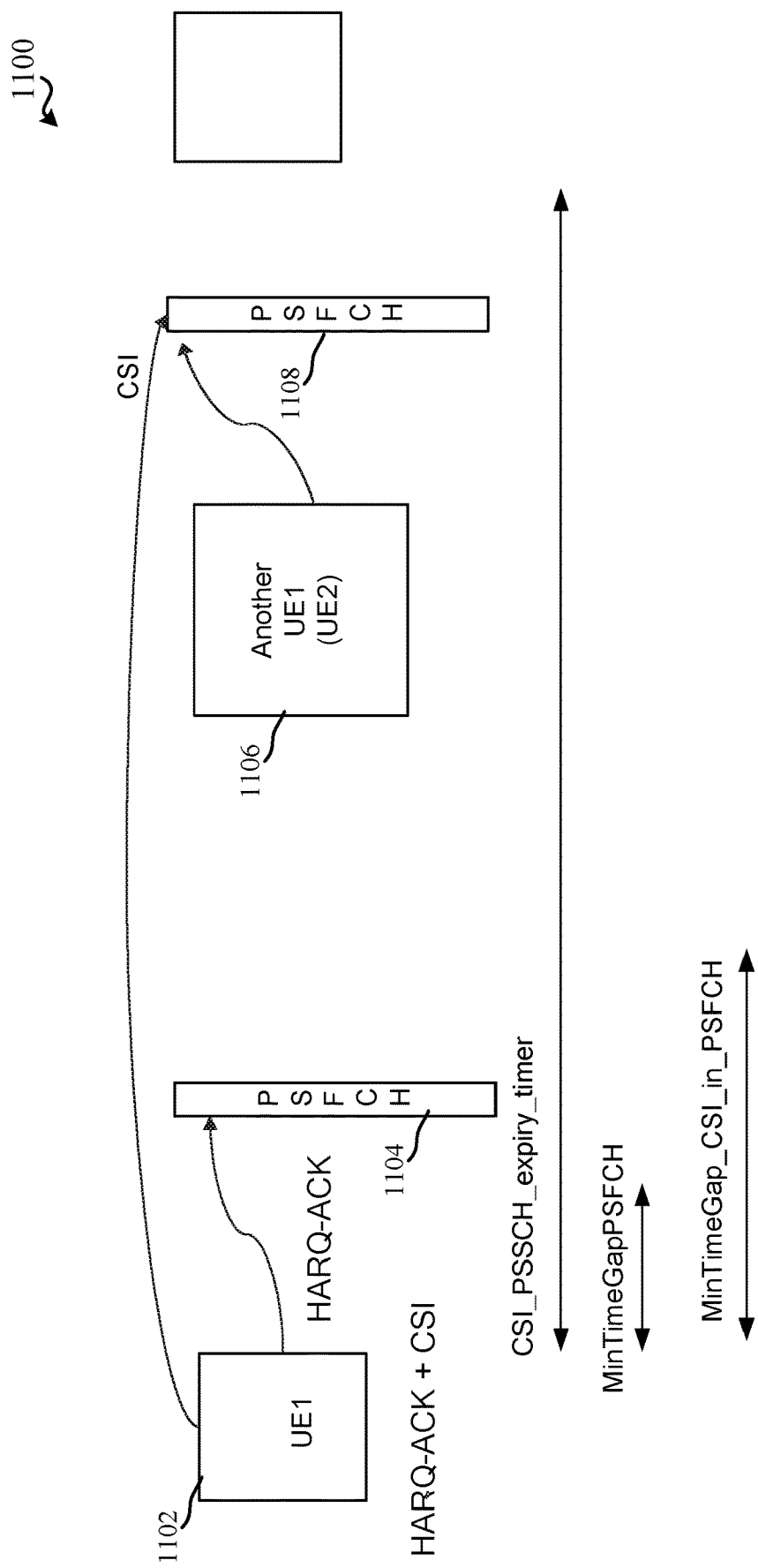
FIG. 11 is an example of a CSI transmission timeline where one UE can transmit CSI in PSFCH resources that collides with another UE transmitting HARQ-ACK feedback in the PSFCH resources, in accordance with various aspects of the present disclosure.

In some examples, it may be possible that CSI transmitted in PSFCH resources by one SL receiving UE 104-*b* may collide with HARQ-ACK transmitted in the same PSFCH resource by another SL receiving UE. FIG. 11 illustrates an example of a CSI transmission timeline 1100 where one UE can transmit CSI in PSFCH resources that collides with another UE transmitting HARQ-ACK feedback in the PSFCH resources. According to CSI transmission timeline 1100, a SL receiving UE 104-*b* (e.g., UE1) can receive a SL communication 1102 for which HARQ-ACK and CSI can be generated. Based on PSFCH resources 1104 occurring after the feedback minimum time gap, MinTimeGapPSFCH, SL receiving UE 104-*b* can transmit the HARQ-ACK for the SL communication 1102 in PSFCH resources 1104. For CSI, however, as the PSFCH resources do not occur after the minimum time gap for transmitting CSI, MinTimeGap_CSI_in_PSFCH, SL receiving UE 104-*b* can refrain from transmitting CSI in PSFCH resources 1104 and can instead wait for PSFCH resources 1108 occurring after MinTimeGap_CSI_in_PSFCH. In an example, however, PSFCH resources 1108 may be used by a second UE (e.g., UE2) for transmitting HARQ-ACK feedback for another SL communication 1106 received by the second UE. This can generate a collision between the CSI and HARQ-ACK transmissions of UE1 and UE2.

To avoid such collision, in an example, PSFCH resources used for CSI may be separately configured, where the UEs can use these separately configured resources to send CSI reports. For example, the separately configured PSFCH resources can have their own periodicity and/or configuration parameters per resource pool (e.g., separate from the periodicity and/or configuration parameters of PSFCH resources for HARQ-ACK or other feedback).

In method 400, optionally at Block 414, the SL receiving UE 104-*b* can receive a configuration defining one or more parameters of PSFCH resources over which to transmit CSI. In an aspect, CSI component 252, e.g., in conjunction with processor(s) 212, memory 216, transceiver 202, communicating component 242, timeline component 254, etc., can receive the configuration (e.g., from SL transmitting UE 104-*a*, base station 102, etc.) defining the one or more parameters of PSFCH resources over which to transmit CSI. As described, for example, the configuration can indicate the PSFCH resources for CSI separately (e.g., as separated in time) from PSFCH resources for HARQ-ACK. An example is illustrated in FIG. 12.

Figure 12:
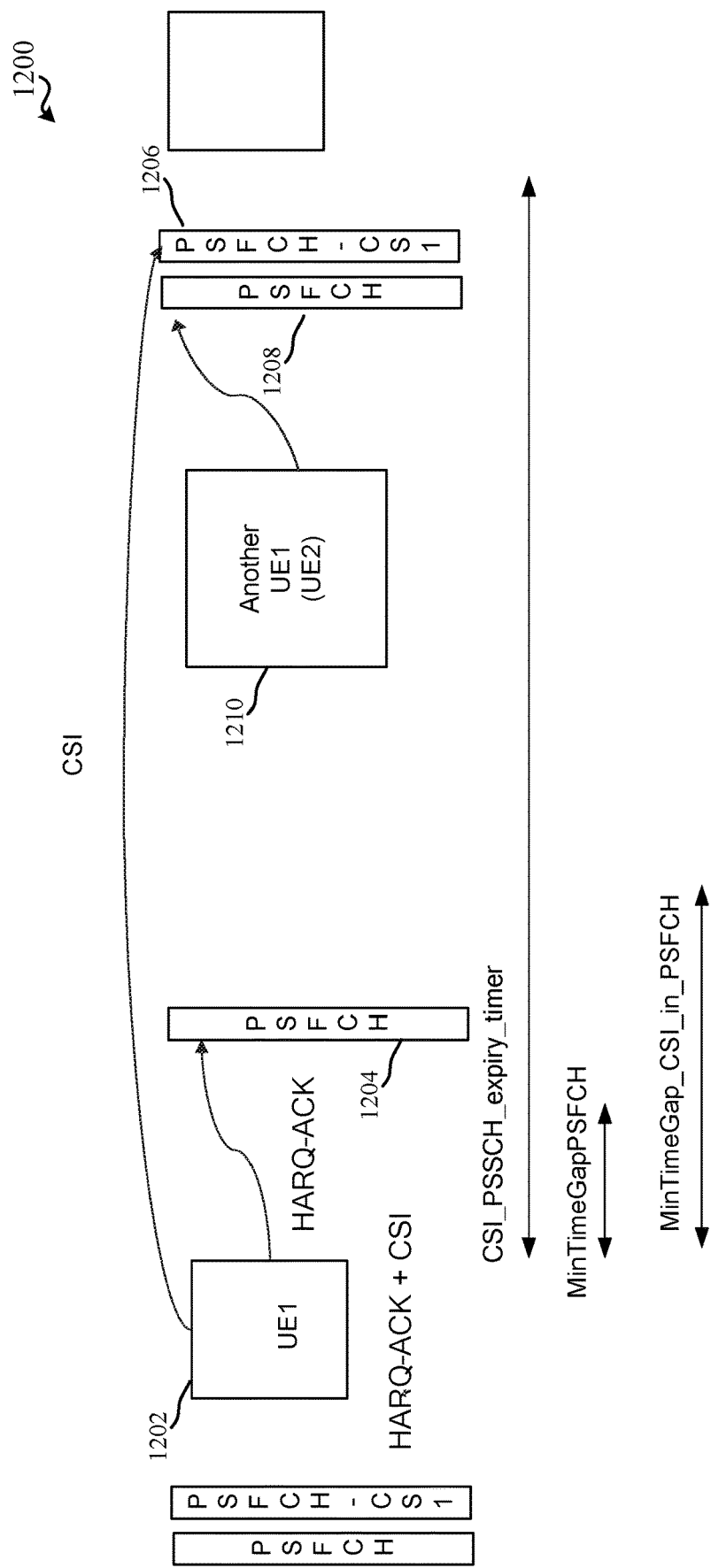
FIG. 12 is an example of a CSI transmission timeline where one UE can transmit CSI in PSFCH resources that are separately configured for CSI, in accordance with various aspects of the present disclosure.

FIG. 12 illustrates an example of a CSI transmission timeline 1200 where one UE can transmit CSI in PSFCH resources that are separately configured for CSI. According to CSI transmission timeline 1200, a SL receiving UE 104-*b* (e.g., UE1) can receive a SL communication 1202 for which HARQ-ACK and CSI can be generated. Based on PSFCH resources 1204 occurring after the feedback minimum time gap, MinTimeGapPSFCH, SL receiving UE 104-*b* can transmit the HARQ-ACK for the SL communication 1202 in PSFCH resources 1204. For CSI, however, as the PSFCH resources do not occur after the minimum time gap for transmitting CSI, MinTimeGap_CSI_in_PSFCH, SL receiving UE 104-*b* can refrain from transmitting CSI in PSFCH resources 1204 and can instead wait for later occurring PSFCH resources, which can include PSFCH resources 1206 that are separately configured for transmitting CSI. In this example, PSFCH resources 1208 can be configured for transmitting HARQ-ACK, and PSFCH resource 1206 can be configured separately from the HARQ-ACK PSFCH resources for transmitting CSI. In an example, using the separately configured PSFCH resources 1206 can avoid collision with PSFCH resources 1208 used by a second UE (e.g., UE2) for transmitting HARQ-ACK feedback for another SL communication 1210 received by the second UE.

Figure 13:
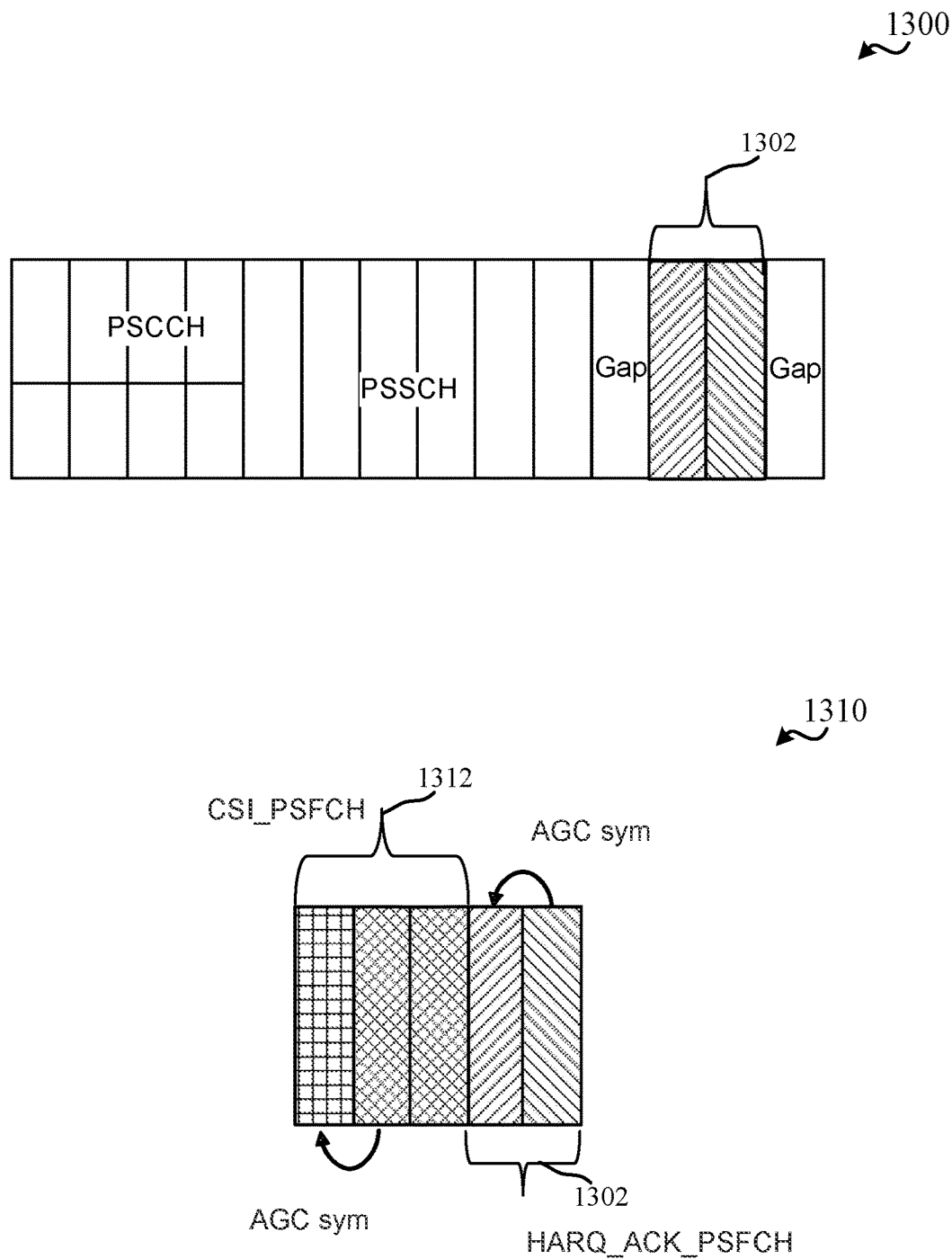
FIG. 13 is an example of an example of resource allocations that define PSFCH resources for CSI that are separate from PSFCH resources for HARQ-ACK, in accordance with various aspects of the present disclosure.

FIG. 13 illustrates an example of resource allocations 1300, 1310 that define PSFCH resources for CSI that are separate from PSFCH resources for HARQ-ACK. For example, resource allocation 1300 includes a plurality of symbols in a slot, including two symbols 1302 reserved for PSFCH, with gap symbols on either side, where gap symbols may not include transmissions. When defining PSFCH resources for CSI, the PSFCH resources 1302 can be maintained so legacy UEs that may not have the capability to transmit CSI over PSFCH can use the PSFCH resources for HARQ-ACK, and UEs configured for transmitting CSI over PSFCH can use newly defined PSFCH resources for CSI. Resource allocation 1310 illustrates one example of PSFCH resources for CSI including symbols 1302 for PSFCH for HARQ-ACK, which may include one AGC symbol, and also symbols 1312 for PSFCH for CSI, which may also include one AGC symbol. In an example, CSI component 252 can receive the configuration defining the one or more parameters of the PSFCH resources for CSI (e.g., an indication of symbols over which to transmit CSI in PSFCH) from the base station 102 or SL transmitting UE 104-a, which may be received in RRC signalling, MAC-CE, DCI, SCI, etc.

In method 400, optionally at Block 416, the SL receiving UE 104-b can receive, from the transmitting UE, a retransmission of the SL transmission having a same phase coherency and QCL (e.g., as the SL transmission received at Block 402). In an aspect, CSI component 252, e.g., in conjunction with processor(s) 212, memory 216, transceiver 202, communicating component 242, timeline component 254, etc., can receive, from the transmitting UE (e.g., SL transmitting UE 104-a), the retransmission of the SL transmission having the same phase coherency and QCL. For example, the SL transmitting UE 104-a can maintain the phase coherency and QCL across the SL transmission and one or multiple retransmissions of the same TB. This may be based on a capability of the SL transmitting UE 104-a of maintaining QCL and phase coherency. In an example, the SL transmitting UE 104-a may indicate that retransmissions are to have the same phase coherency and QCL in the first slot carrying the TB. In examples described above, the SL receiving UE 104-b can cancel CSI when the CSI is not transmitted before a retransmission of a TB. In the above example, if second transmission starts before the PSFCH scheduled to be used to carry the CSI, then this CSI can be canceled and perhaps replaced with the new CSI obtained from the new PSSCH. In one example, transmitting the CSI can be based on determining that transmitting the CSI for the sidelink transmission can occur before receiving the retransmission of the sidelink transmission.

Figure 14:
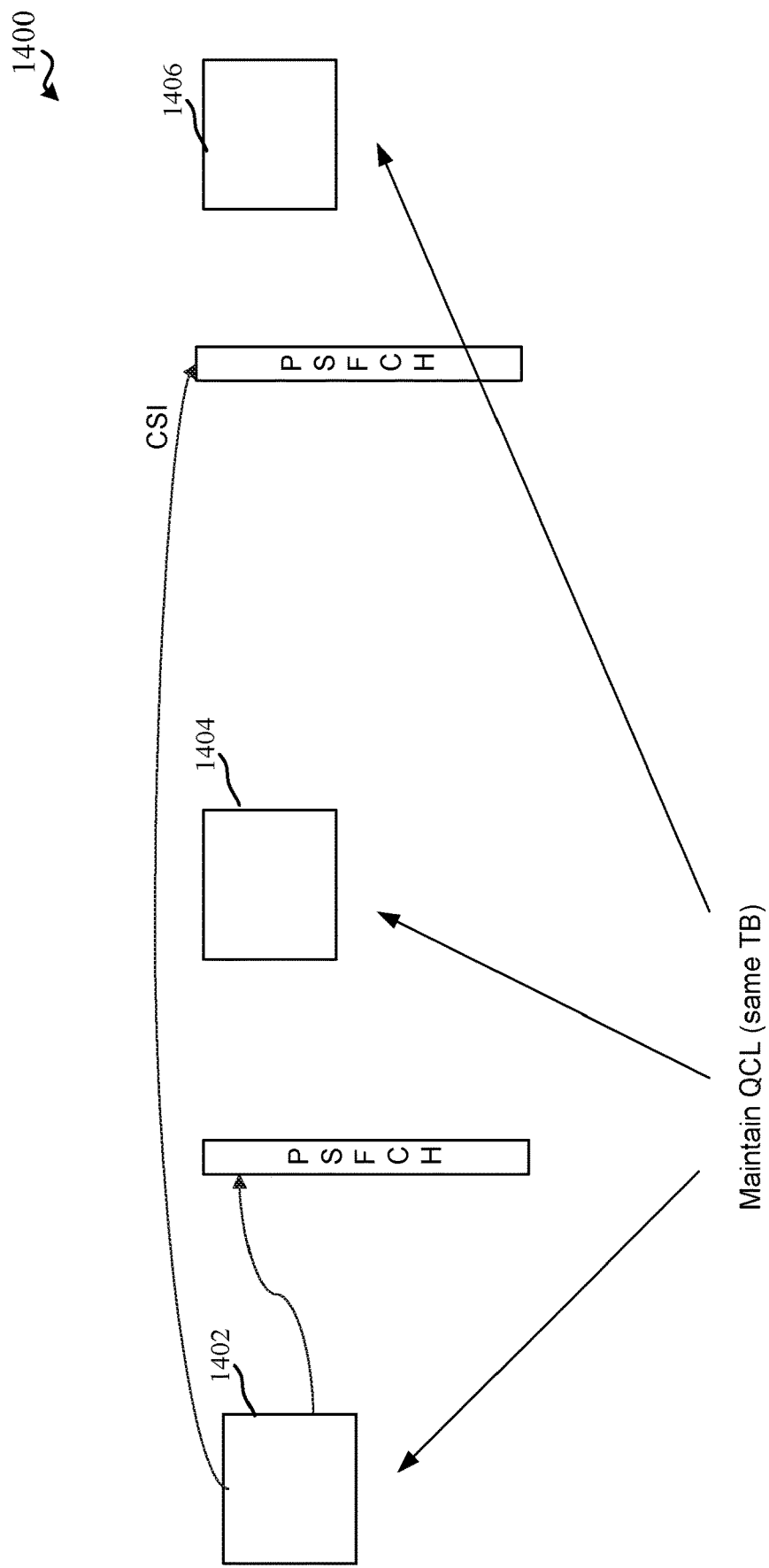
FIG. 14 illustrates an example of a CSI transmission timeline where phase coherency and QCL can be maintained over sidelink transmissions, in accordance with various aspects of the present disclosure.

FIG. 14 illustrates an example of a CSI transmission timeline 1400 where phase coherency and QCL can be maintained over sidelink transmissions. According to CSI transmission timeline 1400, a SL receiving UE 104-b can receive a SL communications 1402, 1404, 1406 of the same TB using the same phase coherency and/or QCL across the SL communications 1402, 1404, 1406. In this regard, for example, CSI may remain valid over the SL communications that use the same phase coherency and/or QCL, which can allow for later reporting without necessarily expiring the CSI.

FIG. 5 illustrates a flow chart of an example of a method 500 for receiving, by a SL transmitting UE, CSI from a SL receiving UE that receives SL communications from the SL transmitting UE. In an example, a UE (e.g., UE 104-a, as a SL transmitting UE in sidelink communications) can perform the functions described in method 500 using one or more of the components described in FIGS. 1 and 2.

In method 500, at Block 502, a SL transmitting UE 104-a can transmit, to a receiving SL UE in SL communications, a SL transmission. In an aspect, communicating component 242, e.g., in conjunction with processor(s) 212, memory 216, transceiver 202, etc., can transmit, to the receiving UE (e.g., SL receiving UE 104-b) in SL communications, the SL transmission. For example, a base station 102 can configure resources or a resource pool for SL communications. In this example, the SL transmitting UE 104-a can transmit SL communications over the resources, or SL resources selected from the resource pool, and SL receiving UE 104-b can receive the SL communications over the resources. The SL communications can include data transmitted over a PSSCH, control data for the PSSCH data transmitted over a PSCCH, a DMRS or LLRs for the data transmitted over the PSSCH (or DMRS or LLRs for the control data transmitted over PSCCH), a CSI-RS or other reference signal, etc., as described.

In method 500, at Block 504, the SL transmitting UE 104-a can receive, from the receiving UE and based on a CSI transmission timeline, the CSI over a PSFCH. In an aspect, CSI component 252, e.g., in conjunction with processor(s) 212, memory 216, transceiver 202, communicating component 242, timeline component 254, etc., can receiving, from the receiving UE (e.g., SL receiving UE 104-b) and based on the CSI transmission time, which can be determined by timeline component 254, the CSI over a PSFCH. For example, as transmission of SL communications and reporting of corresponding CSI may be periodic, CSI component 252 can receive the CSI based on a CSI transmission timeline that allows sufficient time for the SL receiving UE 104-b to process received SL communications and generate CSI and/or can allow for determining a next opportunity for receiving the CSI over the feedback channel (e.g., PSFCH).

In one example, in receiving the CSI at Block 504, optionally at Block 506, the SL transmitting UE 104-a can receive the CSI in PSFCH resources that are after a minimum time gap from resources over which the SL transmission is transmitted. In an aspect, CSI component 252, e.g., in conjunction with processor(s) 212, memory 216, transceiver 202, communicating component 242, timeline component 254, etc., can receive the CSI in the PSFCH resources that are after a minimum time gap from resources over which the SL transmission is transmitted. For example, CSI component 252 can determine the PSFCH resources based on information transmitted to the SL receiving UE 104-b by the SL transmitting UE 104-a, base station 102, etc., which may indicate resources for reporting CSI over PSFCH. For example, CSI component 252 can determine the PSFCH resources as occurring from at least an offset from transmitting the SL communications (e.g., a slot offset of a number of slots from a slot during which the SL communications are transmitted).

In addition, in an example, timeline component 254 can determine the CSI transmission timeline for transmitting the CSI, which may be based on the minimum time gap, based on other considerations, such as determining resources after the minimum time gap that are indicated as, or otherwise reserved for, receiving CSI (whether over PSFCH or other resources), etc. In an example, the minimum time gap may be similar to (e.g., equal to), less than, or greater than a feedback minimum time gap for receiving HARQ feedback for the SL communications, as described above.

In an example, a timeline for CSI from a physical channel can be defined so that the UEs (e.g., the SL receiving UE 104-b and/or SL transmitting UE 104-a) can determine if a CSI is transmitted in a next available CSI carrier (e.g., which may include the next available PSFCH resources) or not, as described. For example, the physical channel may include PSSCH and/or corresponding DMRS or LLRs, CSI-RS, etc. In an example, the minimum time gap can include one or more of a MinTimeGap_CSI_in_PSFCH, MinTimeGap_CSI_in_PSFCH_PSSCH_based, MinTimeGap_CSI_in_PSFCH_CSI-RS_based, etc., as described above. As described above, for example, the minimum time gap may be configured for the SL receiving UE 104-*b* (e.g., by SL transmitting UE 104-*a*, base station 102, etc.). Where SL transmitting UE 104-*a* configures the minimum time gap, it can be configured using SCI transmitted to the SL receiving UE 104-*b*.

In method 500, optionally at Block 508, the SL transmitting UE 104-*a* can determine whether CSI is expired, and/or can receive the CSI based on determining that CSI is not expired. In an aspect, expiring component 256, e.g., in conjunction with processor(s) 212, memory 216, transceiver 202, communicating component 242, etc., can determine whether the CSI is expired and/or can receive the CSI based on determining that the CSI is not expired. For example, as the resources over which to transmit CSI may be periodic, the CSI may become stale and may be expired so that the SL transmitting UE 104-*a* does not process or consider old CSI. As described above, for example, this may be based on a CSI expiration timer, such as CSI_PSSCH_expiry_timer, which may be configured for the SL receiving UE 104-*b* (e.g., by SL transmitting UE 104-*a*, base station 102, etc.). Where SL transmitting UE 104-*a* configures the CSI expiration timer, it can be configured using SCI transmitted to the SL receiving UE 104-*b*.

In method 500, optionally at Block 510, the SL transmitting UE 104-*a* can transmit one or more parameters related to expiring CSI. In an aspect, expiring component 256, e.g., in conjunction with processor(s) 212, memory 216, transceiver 202, communicating component 242, etc., can transmit the one or more parameters (e.g., to SL receiving UE 104-*b*) related to expiring CSI. For example, the one or more parameters can include a value for initializing the CSI expiration timer (e.g., sl-LatencyBound-CSI-Report, CSI_PSSCH_expiry_timer, etc.). In another example, the one or more parameters may include the PSFCH periodicity per resource pool or parameters for determining when to expire CSI based on the PSFCH periodicity. In another example, the one or more parameters may include an indication to expire CSI if it cannot be sent on the same PSFCH resource that carries the HARQ-ACK. In an example, expiring component 256 can transmit the one or more parameters in RRC signaling, MAC-CE, DCI, SCI, etc., as described above and further herein.

In method 500, optionally at Block 512, the SL transmitting UE 104-*a* can transmit a configuration defining one or more parameters of PSFCH resources over which to transmit CSI. In an aspect, CSI component 252, e.g., in conjunction with processor(s) 212, memory 216, transceiver 202, communicating component 242, timeline component 254, etc., can transmit the configuration (e.g., to SL receiving UE 104-*b*) defining the one or more parameters of PSFCH resources over which to transmit CSI. As described, for example, the configuration can indicate the PSFCH resources for CSI separately from PSFCH resources for HARQ-ACK.

In method 500, optionally at Block 514, the SL transmitting UE 104-*a* can transmit, to the receiving UE, a retransmission of the SL transmission having a same phase coherency and QCL (e.g., as the SL transmission transmitted at Block 502). In an aspect, CSI component 252, e.g., in conjunction with processor(s) 212, memory 216, transceiver 202, communicating component 242, timeline component 254, etc., can transmit, to the receiving UE (e.g., SL receiving UE 104-*b*), the retransmission of the SL transmission having the same phase coherency and QCL. For example, the SL transmitting UE 104-*a* can maintain the phase coherency and QCL across the SL transmission and one or multiple retransmissions of the same TB, as described. In an example, this may be based on a capability of the SL transmitting UE 104-*a* of maintaining QCL and phase coherency, which may be indicated in the first slot carrying the TB.

FIG. 6 illustrates a flow chart of an example of a method 600 for configuring SL UEs to communicate CSI using PSFCH resources. In an example, a base station (e.g., base station 102) can perform the functions described in method 600 using one or more of the components described in FIGS. 1 and 3.

In method 600, at Block 602, the base station 102 can generate a configuration indicating resources to use in communicating CSI for sidelink transmission over a PSFCH. In an aspect, configuring component 342, e.g., in conjunction with processor(s) 312, memory 316, transceiver 302, timeline configuring component 352, etc., can generate the configuration indicating resources to use in communicating CSI for sidelink transmissions over a PSFCH. For example, configuring component 342 can generate the configuration to indicate resources or a resource pool for PSFCH and/or whether the resources or resource pool can be used for CSI. In another example, configuring component 342 can generate the configuration to indicate resources for HARQ-ACK, or other feedback, and separate PSFCH resources for CSI. In addition, for example, timeline configuring component 352 can include, in the configuration or a separate configuration, one or more parameters related to a CSI transmission timeline for transmitting CSI in PSFCH resources, such as a minimum time gap, a CSI expiration timer value, etc.

As described above, the expiration time may be defined for aperiodic CSI reporting (e.g., a sl-LatencyBound-CSI-Report, or another parameter). In another example, the expiration time may correspond to a periodicity for transmitting over the PSFCH per resource pool available for sidelink transmissions. In another example, the configuration can indicate PSFCH resources reserved for transmitting the CSI over the PSFCH that are separated, in time, from feedback PSFCH resources reserved for transmitting HARQ-ACK feedback for the sidelink transmissions, where the feedback PSFCH resources may include PSFCH resources indicated in a last two symbols of a slot corresponding to the sidelink transmissions, and the PSFCH resources for CSI may be other symbols in the slot.

In method 600, at Block 604, the base station 102 can transmit the configuration to at least one transmitting UE and/or one receiving UE that communicate with one another in sidelink communications. In an aspect, configuring component 342, e.g., in conjunction with processor(s) 312, memory 316, transceiver 302, etc., can transmit the configuration to at least one transmitting UE and/or receiving UE that communicate with one another in sidelink communications. In this example, the SL transmitting UE 104-*a* and/or SL receiving UE 104-*b*, as described above, can receive the configuration and determine one or more of resources or a resource pool for communicating CSI over PSFCH resources, a CSI transmission timeline based on which to transmit CSI over PSFCH resources, an expiration time for expiring CSI that is to be transmitted over PSFCH resources, etc.

Figure 15:
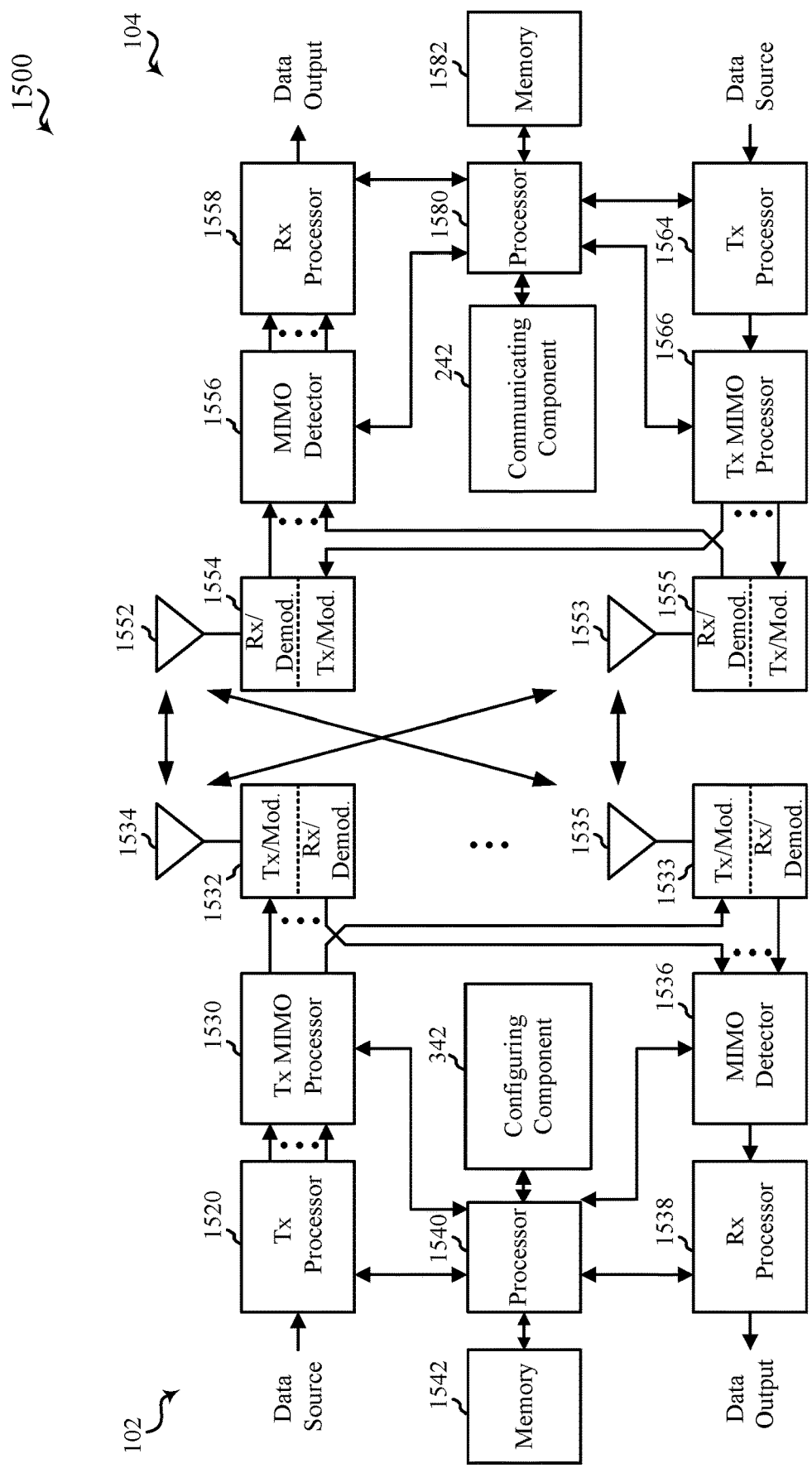
FIG. 15 is a block diagram illustrating an example of a multiple-input multiple-output (MIMO) communication system including a base station and a UE, in accordance with various aspects of the present disclosure.

FIG. 15 is a block diagram of a MIMO communication system 1500 including a base station 102 and a UE 104, in accordance with various aspects of the present disclosure. The MIMO communication system 1500 may illustrate aspects of the wireless communication access network 100 described with reference to FIG. 1. The base station 102 may be an example of aspects of the base station 102 described with reference to FIG. 1. In addition, the UE 104 can communicate with another UE over sidelink resources using similar functionality described herein with respect to UE 104 and base station 102 communications, and as such, base station 102 could be another UE 104 having a communicating component 242.

The base station 102 may be equipped with antennas 1534 and 1535, and the UE 104 may be equipped with antennas 1552 and 1553. In the MIMO communication system 1500, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1520 may receive data from a data source. The transmit processor 1520 may process the data. The transmit processor 1520 may also generate control symbols or reference symbols. A transmit MIMO processor 1530 may perform spatial processing (e.g., precoding) on data symbols, control symbols, or reference symbols, if applicable, and may provide output symbol streams to the transmit modulator/demodulators 1532 and 1533. Each modulator/demodulator 1532 through 1533 may process a respective output symbol stream (e.g., for OFDM, etc.) to obtain an output sample stream. Each modulator/demodulator 1532 through 1533 may further process (e.g., convert to analog, amplify, filter, and upconvert) the output sample stream to obtain a DL signal. In one example, DL signals from modulator/demodulators 1532 and 1533 may be transmitted via the antennas 1534 and 1535, respectively.

The UE 104 may be an example of aspects of the UEs 104 described with reference to FIGS. 1-2. At the UE 104, the UE antennas 1552 and 1553 may receive the DL signals from the base station 102 and may provide the received signals to the modulator/demodulators 1554 and 1555, respectively. Each modulator/demodulator 1554 through 1555 may condition (e.g., filter, amplify, downconvert, and digitize) a respective received signal to obtain input samples. Each modulator/demodulator 1554 through 1555 may further process the input samples (e.g., for OFDM, etc.) to obtain received symbols. A MIMO detector 1556 may obtain received symbols from the modulator/demodulators 1554 and 1555, perform MIMO detection on the received symbols, if applicable, and provide detected symbols. A receive (Rx) processor 1558 may process (e.g., demodulate, deinterleave, and decode) the detected symbols, providing decoded data for the UE 104 to a data output, and provide decoded control information to a processor 1580, or memory 1582.

The processor 1580 may in some cases execute stored instructions to instantiate a communicating component 242 (see e.g., FIGS. 1 and 2).

On the uplink (UL), at the UE 104, a transmit processor 1564 may receive and process data from a data source. The transmit processor 1564 may also generate reference symbols for a reference signal. The symbols from the transmit processor 1564 may be precoded by a transmit MIMO processor 1566 if applicable, further processed by the modulator/demodulators 1554 and 1555 (e.g., for SC-FDMA, etc.), and be transmitted to the base station 102 in accordance with the communication parameters received from the base station 102. At the base station 102, the UL signals from the UE 104 may be received by the antennas 1534 and 1535, processed by the modulator/demodulators 1532 and 1533, detected by a MIMO detector 1536 if applicable, and further processed by a receive processor 1538. The receive processor 1538 may provide decoded data to a data output and to the processor 1540 or memory 1542.

The processor 1540 may in some cases execute stored instructions to instantiate a configuring component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 1500. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 1500.

The following aspects are illustrative only and aspects thereof may be combined with aspects of other embodiments or teaching described herein, without limitation.

Aspect 1 is a method for wireless communication by a receiving UE in sidelink communications including receiving, from a transmitting UE in sidelink communications, a sidelink transmission, generating CSI for the sidelink transmission, and transmitting, to the transmitting UE and based on a CSI transmission timeline, the CSI over a PSFCH.

In Aspect 2, the method of Aspect 1 includes where the CSI transmission timeline is associated with a minimum time gap for transmitting the CSI after receiving the sidelink transmission, and where transmitting the CSI includes transmitting the CSI in PSFCH resources that are after the minimum time gap from resources over which the sidelink transmission is received.

In Aspect 3, the method of Aspect 2 includes where the sidelink transmission is at least one of a PSSCH or PSCCH transmission, where generating the CSI is based on a DMRS or one or more LLRs of the PSSCH or PSCCH transmission, and where the minimum time gap is less than a feedback minimum time gap for transmitting HARQ feedback for the PSSCH or PSCCH transmission.

In Aspect 4, the method of any of Aspects 2 or 3 includes where the sidelink transmission is at least one of a PSSCH or PSCCH transmission, and where the minimum time gap is greater than a feedback minimum time gap for transmitting HARQ feedback for the PSSCH or PSCCH transmission.

In Aspect 5, the method of any of Aspects 1 to 4 includes where the sidelink transmission is a CSI-RS.

In Aspect 6, the method of any of Aspects 1 to 5 includes where transmitting the CSI is based on an expiration time not expiring before transmitting the CSI.

In Aspect 7, the method of Aspect 6 includes where the expiration time is defined for aperiodic CSI reporting.

In Aspect 8, the method of any of Aspects 6 or 7 includes receiving an indication of the expiration time from the transmitting UE or from a base station in control information signaling, RRC signaling, or MAC-CE signaling.

In Aspect 9, the method of any of Aspects 6 to 8 includes where the expiration time corresponds to a periodicity for transmitting over a PSFCH per resource pool available for sidelink transmissions.

In Aspect 10, the method of any of Aspects 6 to 9 includes where the expiration time corresponds to a next PSFCH resource that carries HARQ feedback for the sidelink transmission.

In Aspect 11, the method of any of Aspects 1 to 10 includes where PSFCH resources reserved for transmitting the CSI over the PSFCH are separated, in time, from feedback PSFCH resources reserved for transmitting HARQ feedback for the sidelink transmission.

In Aspect 12, the method of Aspect 11 includes receiving a configuration defining one or more parameters of the PSFCH resources that is separate from a feedback configuration defining one or more other parameters of the feedback PSFCH resources, where the one or more parameters include at least a periodicity of the PSFCH resources per resource pool.

In Aspect 13, the method of any of Aspects 11 or 12 includes where the feedback PSFCH resources are defined in a last two symbols of a slot corresponding to the sidelink transmission, and where the PSFCH resources are defined in one or more other symbols of the slot.

In Aspect 14, the method of any of Aspects 1 to 13 includes receiving, from the transmitting UE, a retransmission of the sidelink transmission includes where the sidelink transmission and the retransmission have a same phase coherency and quasi-colocation.

In Aspect 15, the method of Aspect 14 includes where transmitting the CSI is based on determining that transmitting the CSI for the sidelink transmission can occur before receiving the retransmission of the sidelink transmission.

Aspect 16 is a method for wireless communication by a transmitting UE in sidelink communications including transmitting, to a receiving UE in sidelink communications, a sidelink transmission, and receiving, from the receiving UE and based on a CSI transmission timeline, the CSI over a PSFCH.

In Aspect 17, the method of Aspect 16 includes where the CSI transmission timeline is associated with a minimum time gap for transmitting the CSI after receiving the sidelink transmission, and where receiving the CSI includes receiving the CSI in PSFCH resources that are after the minimum time gap from resources over which the sidelink transmission is transmitted.

In Aspect 18, the method of Aspect 17 includes where the sidelink transmission is at least one of a PSSCH or PSCCH transmission, where the CSI transmission timeline is based on a DMRS or one or more LLRs of the PSSCH or PSCCH transmission, and where the minimum time gap is less than a feedback minimum time gap for transmitting HARQ feedback for the PSSCH or PSCCH transmission.

In Aspect 19, the method of any of Aspects 17 to 18 includes where the sidelink transmission is at least one of a PSSCH or PSCCH transmission, and where the minimum time gap is greater than a feedback minimum time gap for transmitting HARQ feedback for the PSSCH or PSCCH transmission.

In Aspect 20, the method of any of Aspects 16 to 19 includes where the sidelink transmission is a CSI-RS.

In Aspect 21, the method of any of Aspects 16 to 20 includes where receiving the CSI is based on determining that an expiration time does not expire before the receiving UE transmitted the CSI.

In Aspect 22, the method of Aspect 21 includes where the expiration time is defined for aperiodic CSI reporting.

In Aspect 23, the method of any of Aspects 21 or 22 includes transmitting an indication of the expiration time to the receiving UE in control information signaling.

In Aspect 24, the method of any of Aspects 21 to 23 includes where the expiration time corresponds to a periodicity for transmitting over a PSFCH per resource pool available for sidelink transmissions.

In Aspect 25, the method of any of Aspects 21 to 24 includes where the expiration time corresponds to a next PSFCH resource that carries HARQ feedback for the sidelink transmission.

In Aspect 26, the method of any of Aspects 16 to 25 includes where PSFCH resources reserved for transmitting the CSI over the PSFCH are separated, in time, from feedback PSFCH resources reserved for transmitting HARQ feedback for the sidelink transmission.

In Aspect 27, the method of Aspect 26 includes transmitting, to the receiving UE, a configuration defining one or more parameters of the PSFCH resources that is separate from a feedback configuration defining one or more other parameters of the feedback PSFCH resources, where the one or more parameters include at least a periodicity of the PSFCH resources per resource pool.

In Aspect 28, the method of any of Aspects 26 or 27 includes where the feedback PSFCH resources are defined in a last two symbols of a slot corresponding to the sidelink transmission, and where the PSFCH resources are defined in one or more other symbols of the slot.

In Aspect 29, the method of any of Aspects 16 to 28 includes transmitting, to the receiving UE, a retransmission of the sidelink transmission, where the sidelink transmission and the retransmission have a same phase coherency and quasi-colocation.

In Aspect 30, the method of Aspect 29 includes where receiving the CSI is based on determining that receiving the CSI for the sidelink transmission can occur before transmitting the retransmission of the sidelink transmission.

Aspect 31 is a method for wireless communication by a base station including generating a configuration indicating resources to use in communicating CSI for sidelink transmissions over a PSFCH, and transmitting the configuration to at least one transmitting UE and one receiving UE that communicate with one another in sidelink communications.

In Aspect 32, the method of Aspect 31 includes where the configuration indicates a minimum time gap for transmitting the CSI over the PSFCH after receiving a sidelink transmission based on which the CSI is generated.

In Aspect 33, the method of any of Aspects 31 or 32 includes where the configuration indicates an expiration time before which the CSI can be transmitted over the PSFCH after receiving a sidelink transmission based on which the CSI is generated.

In Aspect 34, the method of Aspect 33 includes where the expiration time is defined for aperiodic CSI reporting.

In Aspect 35, the method of any of Aspects 33 or 34 includes where the expiration time corresponds to a periodicity for transmitting over the PSFCH per resource pool available for sidelink transmissions.

In Aspect 36, the method of any of Aspects 31 to 35 includes where the configuration indicates PSFCH resources reserved for transmitting the CSI over the PSFCH that are separated, in time, from feedback PSFCH resources reserved for transmitting HARQ feedback for the sidelink transmissions.

In Aspect 37, the method of Aspect 36 includes where the feedback PSFCH resources are indicated in a last two symbols of a slot corresponding to the sidelink transmissions, and where the PSFCH resources are indicated in one or more other symbols of the slot.

In Aspect 38, the method of any of Aspects 31 to 37 includes where transmitting the configuration comprises transmitting the configuration using downlink control information signaling, RRC signaling, or MAC-CE signaling.

Aspect 39 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 37.

Aspect 40 is an apparatus for wireless communication including means for performing one or more of the methods of any of Aspects 1 to 37.

Aspect 41 is a computer-readable medium including code executable by one or more processors for wireless communications, the code including code for performing one or more of the methods of any of Aspects 1 to 37.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
   a transceiver;
   a memory configured to store instructions; and
   one or more processors communicatively coupled with the transceiver and the memory, wherein the one or more processors are configured to:

receive, from a transmitting user equipment (UE) in sidelink communications, a sidelink transmission;

generate channel state information (CSI) for the sidelink transmission; and transmit, to the transmitting UE and based on a CSI transmission timeline, the CSI over a physical sidelink feedback channel (PSFCH), wherein the CSI transmission timeline is associated with a minimum time gap for transmitting the CSI after receiving the sidelink transmission, and wherein the minimum time gap for transmitting the CSI is set to one of a plurality of different gap sizes depending on a type of the sidelink transmission that is used to generate the CSI.

2. The apparatus of claim 1, wherein the one or more processors are configured to transmit the CSI in PSFCH resources that are after the minimum time gap from resources over which the sidelink transmission is received, and wherein the minimum time gap is set to a different gap size for first CSI that is generated based on a physical sidelink shared channel (PSSCH) transmission than for second CSI that is generated based on a CSI reference signal (CSI-RS).

3. The apparatus of claim 2, wherein the sidelink transmission is at least one of a physical sidelink shared channel (PSSCH) or physical sidelink control channel (PSCCH) transmission, wherein the CSI is generated based on a demodulation reference signal (DMRS) or one or more log likelihood ratios (LLRs) of the PSSCH or PSCCH transmission, and wherein the minimum time gap is less than a feedback minimum time gap for transmitting hybrid automatic repeat/request (HARQ) feedback for the PSSCH or PSCCH transmission based on the CSI being based on the DMRS or the one or more LLRs of the PSSCH or PSCCH transmission.

4. The apparatus of claim 2, wherein the sidelink transmission is a physical sidelink shared channel (PSSCH) transmission, wherein the CSI is generated based on data tones of the PSSCH transmission, and wherein the minimum time gap is greater than a feedback minimum time gap for transmitting hybrid automatic repeat/request (HARQ) feedback for the PSSCH or PSCCH transmission based on the CSI being based on the data tones of the PSSCH transmission.

5. The apparatus of claim 1, wherein the sidelink transmission is a CSI reference signal (CSI-RS), wherein the CSI is generated based on the CSI-RS, and wherein the minimum time gap is set to a larger gap size than used for other CSI generated based on data tones, a demodulation reference signal (DMRS), or a log likelihood ratio (LLR) of a physical sidelink shared channel (PSSCH) or physical sidelink control channel (PSCCH) transmission.

6. The apparatus of claim 1, wherein the one or more processors are configured to transmit the CSI based on an expiration time not expiring before transmitting the CSI.

7. The apparatus of claim 6, wherein the expiration time is defined for aperiodic CSI reporting.

8. The apparatus of claim 6, wherein the expiration time corresponds to at least one of a periodicity for transmitting over a PSFCH per resource pool available for sidelink transmissions, or a next PSFCH resource that carries hybrid automatic repeat/request (HARQ) feedback for the sidelink transmission.

9. The apparatus of claim 1, wherein PSFCH resources reserved for transmitting the CSI over the PSFCH are separated, in time, from feedback PSFCH resources reserved for transmitting hybrid automatic repeat/request (HARQ) feedback for the sidelink transmission.

10. The apparatus of claim 9, wherein the one or more processors are further configured to receive a configuration defining one or more parameters of the PSFCH resources that is separate from a feedback configuration defining one or more other parameters of the feedback PSFCH resources, wherein the one or more parameters include at least a periodicity of the PSFCH resources per resource pool.

11. The apparatus of claim 10, wherein the feedback PSFCH resources are defined in a last two symbols of a slot corresponding to the sidelink transmission, and wherein the PSFCH resources are defined in one or more other symbols of the slot.

12. The apparatus of claim 1, wherein the one or more processors are further configured to receive, from the transmitting UE, a retransmission of the sidelink transmission, wherein the sidelink transmission and the retransmission have a same phase coherency and quasi-colocation.

13. The apparatus of claim 12, wherein the one or more processors are configured to transmit the CSI based on determining that transmitting the CSI for the sidelink transmission can occur before receiving the retransmission of the sidelink transmission.

14. An apparatus for wireless communication, comprising:
 a transceiver;
 a memory configured to store instructions; and
 one or more processors communicatively coupled with the transceiver and the memory, wherein the one or more processors are configured to:
 transmit, to a receiving user equipment (UE) in sidelink communications, a sidelink transmission; and
 receive, from the receiving UE and based on a channel state information (CSI) transmission timeline, CSI over a physical sidelink feedback channel (PSFCH), wherein the CSI transmission timeline is associated with a minimum time gap for transmitting the CSI after receiving the sidelink transmission, and wherein the minimum time gap for transmitting the CSI is set to one of a plurality of different gap sizes depending on a type of the sidelink transmission that is used to generate the CSI.

15. The apparatus of claim 14, wherein the one or more processors are configured to receive the CSI in PSFCH resources that are after the minimum time gap from resources over which the sidelink transmission is transmitted, and wherein the minimum time gap is set to a different gap size for first CSI that is generated based on a physical sidelink shared channel (PSSCH) transmission than for second CSI that is generated based on a CSI reference signal (CSI-RS).

16. The apparatus of claim 15, wherein the sidelink transmission is at least one of a physical sidelink shared channel (PSSCH) or physical sidelink control channel (PSCCH) transmission, wherein the CSI transmission timeline is based on a demodulation reference signal (DMRS) or one or more log likelihood ratios (LLRs) of the PSSCH or PSCCH transmission, and wherein the minimum time gap is less than a feedback minimum time gap for transmitting hybrid automatic repeat/request (HARQ) feedback for the PSSCH or PSCCH transmission based on the CSI being based on the DMRS or the one or more LLRs of the PSSCH or PSCCH transmission.

17. The apparatus of claim 15, wherein the sidelink transmission is a physical sidelink shared channel (PSSCH) transmission, wherein the CSI is generated based on data tones of the PSSCH transmission, and wherein the minimum time gap is greater than a feedback minimum time gap for transmitting hybrid automatic repeat/request (HARQ) feedback for the PSSCH or PSCCH transmission based on the CSI being based on the data tones of the PSSCH transmission.

18. The apparatus of claim 14, wherein the sidelink transmission is a CSI reference signal (CSI-RS), wherein the CSI is generated based on the CSI-RS, and wherein the minimum time gap is set to a larger gap size than used for other CSI generated based on data tones, a demodulation reference signal (DMRS), or a log likelihood ratio (LLR) of a physical sidelink shared channel (PSSCH) or physical sidelink control channel (PSCCH) transmission.

19. The apparatus of claim 14, wherein the one or more processors are configured to receive the CSI based on determining that an expiration time does not expire before the receiving UE transmitted the CSI.

20. The apparatus of claim 19, wherein the expiration time is defined for aperiodic CSI reporting.

21. The apparatus of claim 19, wherein the one or more processors are further configured to transmit an indication of the expiration time to the receiving UE in control information signaling.

22. The apparatus of claim 19, wherein the expiration time corresponds to at least one of a periodicity for transmitting over a PSFCH per resource pool available for sidelink transmissions or a next PSFCH resource that carries hybrid automatic repeat/request (HARQ) feedback for the sidelink transmission.

23. The apparatus of claim 14, wherein PSFCH resources reserved for transmitting the CSI over the PSFCH are separated, in time, from feedback PSFCH resources reserved for transmitting hybrid automatic repeat/request (HARQ) feedback for the sidelink transmission.

24. The apparatus of claim 23, wherein the one or more processors are further configured to transmit, to the receiving UE, a configuration defining one or more parameters of the PSFCH resources that is separate from a feedback configuration defining one or more other parameters of the feedback PSFCH resources, wherein the one or more parameters include at least a periodicity of the PSFCH resources per resource pool.

25. The apparatus of claim 23, wherein the feedback PSFCH resources are defined in a last two symbols of a slot corresponding to the sidelink transmission, and wherein the PSFCH resources are defined in one or more other symbols of the slot.

26. The apparatus of claim 14, wherein the one or more processors are configured to transmit, to the receiving UE, a retransmission of the sidelink transmission, wherein the sidelink transmission and the retransmission have a same phase coherency and quasi-colocation.

27. The apparatus of claim 26, wherein the one or more processors are configured to receive the CSI based on determining that receiving the CSI for the sidelink transmission can occur before transmitting the retransmission of the sidelink transmission.

28. A method for wireless communication by a receiving user equipment (UE) in sidelink communications, comprising:
receiving, from a transmitting UE in sidelink communications, a sidelink transmission;
generating channel state information (CSI) for the sidelink transmission; and
transmitting, to the transmitting UE and based on a CSI transmission timeline, the CSI over a physical sidelink feedback channel (PSFCH), wherein the CSI transmission timeline is associated with a minimum time gap for transmitting the CSI after receiving the sidelink transmission, and wherein the minimum time gap for transmitting the CSI is set to one of a plurality of different gap sizes depending on a type of the sidelink transmission that is used to generate the CSI.

29. The method of claim 28, wherein transmitting the CSI includes transmitting the CSI in PSFCH resources that are after the minimum time gap from resources over which the sidelink transmission is received, and wherein the minimum time gap is set to a different gap size for first CSI that is generated based on a physical sidelink shared channel (PSSCH) transmission than for second CSI that is generated based on a CSI reference signal (CSI-RS).

30. A method for wireless communication by a transmitting user equipment (UE) in sidelink communications, comprising:
transmitting, to a receiving UE in sidelink communications, a sidelink transmission; and
receiving, from the receiving UE and based on a channel state information (CSI) transmission timeline, CSI over a physical sidelink feedback channel (PSFCH), wherein the CSI transmission timeline is associated with a minimum time gap for transmitting the CSI after receiving the sidelink transmission, and wherein the minimum time gap for transmitting the CSI is set to one of a plurality of different gap sizes depending on a type of the sidelink transmission that is used to generate the CSI.

* * * * *